US012090775B2

(12) United States Patent
Mochizuki et al.

(10) Patent No.: US 12,090,775 B2
(45) Date of Patent: Sep. 17, 2024

(54) SHEET BINDING APPARATUS, STITCHER, CONTROL DEVICE FOR STITCHER, AND CONTROL METHOD FOR STITCHER

(71) Applicant: Horizon Inc., Takashima (JP)

(72) Inventors: Jun Mochizuki, Takashima (JP); Bui Manh Ha, Takashima (JP)

(73) Assignee: HORIZON INC., Takashima (JP)

( * ) Notice: Subject to any disclaimer, the term of this patent is extended or adjusted under 35 U.S.C. 154(b) by 0 days.

(21) Appl. No.: 18/121,141

(22) Filed: Mar. 14, 2023

(65) Prior Publication Data

US 2023/0294444 A1 Sep. 21, 2023

(30) Foreign Application Priority Data

Mar. 15, 2022 (JP) ................................ 2022-040409

(51) Int. Cl.
*B42B 4/00* (2006.01)

(52) U.S. Cl.
CPC ..................................... *B42B 4/00* (2013.01)

(58) Field of Classification Search
CPC ........................................................ B42B 4/00
USPC ................ 412/1, 6, 9, 11, 14, 18, 25, 33, 35
See application file for complete search history.

(56) References Cited

U.S. PATENT DOCUMENTS 7,032,898 B2 4/2006 Silberbauer
2006/0182521 A1* 8/2006 Richter .................... B65H 7/02 412/33

FOREIGN PATENT DOCUMENTS

DE 102017202571 A1 8/2017
EP 0013164 B1 9/1984
JP 2017-193089 A 10/2017

* cited by examiner

*Primary Examiner* — Justin V Lewis
(74) *Attorney, Agent, or Firm* — Panitch Schwarze Belisario & Nadel LLP

(57) ABSTRACT

An object is to eliminate waste of resources and achieve cost reduction and improved productivity. A stitcher includes a stitcher head configured to perform a reciprocating movement and a wire feed unit configured to feed a wire to the stitcher head and performs wire stitching on a paper bundle arranged at a wire stitching position in each cycle of the reciprocating movement of the stitcher head. The stitcher control device includes: a determination unit that determines in each cycle of the stitcher head whether or not thickness information on a paper bundle to be subjected to wire stitching in a next cycle is acquired; and a wire feed control unit that, when it is determined that the thickness information on the paper bundle to be subjected to wire stitching in the next cycle is not acquired, controls the wire feed unit not to supply a wire in the current cycle.

12 Claims, 23 Drawing Sheets

SHEET BINDING APPARATUS, STITCHER, CONTROL DEVICE FOR STITCHER, AND CONTROL METHOD FOR STITCHER

CROSS-REFERENCE TO RELATED APPLICATIONS

This application is based on Japanese Patent Application No. 2022-040409 filed on Mar. 15, 2022, the contents of which are incorporated herein by reference in its entirety.

BACKGROUND

1. Technical Field

The present disclosure relates to a sheet binding apparatus, a stitcher, a control device for a stitcher, and a control method for a stitcher.

2. Description of Related Art

Conventionally, stitchers that stitches transported paper bundles with wires are known.

Japanese Patent Application Laid-Open No. 2017-193089 discloses a stitcher including a stitcher head configured to reciprocate, a drive mechanism configured to drive the stitcher head, a feed roller unit linked in operation to the stitcher head to feed a wire, and a cutter unit linked in operation to the stitcher head to cut the wire.

In the stitcher disclosed in Japanese Patent Application Laid-Open No. 2017-193089, an operation to drive a wire prepared in the previous cycle into a paper bundle (hereafter, referred to as "first paper bundle") and an operation to prepare a wire to be driven into a paper bundle (hereafter, referred to as "second paper bundle") for wire stitching in the next cycle are performed in parallel during one cycle of a vertical movement of the stitcher head. The operation to prepare a wire consists mainly of feeding, cutting, and setting of a wire.

In such an operation, the vertical stroke positions of the stitcher head are determined in accordance with the thickness of the first paper bundle into which a wire is driven in the current one cycle. Since the vertical stroke and wire feeding of the stitcher head are linked in operation to each other, however, the length of the wire prepared in the current cycle (that is, the length of a wire driven into the second paper bundle in the next cycle) is also set to the length in accordance with the thickness of the first paper bundle. Thus, when the first paper bundle and the second paper bundle differ in thickness, a wire having a length in accordance with the thickness of the first paper bundle will be driven into the second paper bundle, and this may lead to a defective book.

Accordingly, in Japanese Patent Application Laid-Open No. 2017-193089, determination is automatically made as to whether or not a paper bundle that has been subjected to wire stitching is a non-defective product, and a paper bundle determined as a defective product is removed.

In recent years, a stitcher that can supply a wire having any length without linkage to a vertical stroke of a stitcher head has been proposed (for example, see German Patent Application Laid-Open No. 102017202571). According to the stitcher disclosed in German Patent Application Laid-Open No. 102017202571, it is possible to prepare a wire having a length in accordance with a thickness of a paper bundle to be subjected to wire stitching and thus suppress a defective product from occurring.

Japanese Patent Application Laid-Open No. 2017-193089 and German Patent Application Laid-Open No. 102017202571 are examples of the related arts.

BRIEF SUMMARY

In the saddle binder disclosed in German Patent Application Laid-Open No. 102017202571 described above, when jobs are continuously provided, it is always possible to prepare a wire that matches a length of a paper bundle to be subjected to wire stitching in the next cycle.

When information on the next job is not received at the time the current job ends, however, the thickness of a paper bundle subjected to the next wire stitching is not known. Thus, conventionally, the operation of a stitcher is suspended in a state where a wire in accordance with the length of the last paper bundle for a job that has been executed is prepared. Thus, at start of anew job, it is conventionally required to perform test wire driving, that is, drive a wire of an unsuitable length prepared in the previous job into a paper bundle prepared for the test wire driving and prepare a new wire having a suitable length in accordance with the thickness of a paper bundle for a new job.

However, such test wire driving wastes both a paper bundle and a wire and thus leads to waste of resources, and this is not preferable in terms of the environmental load and cost.

The present disclosure has been made in view of such circumstances and intends to provide a sheet binding apparatus, a stitcher, a control device for a stitcher, and a control method for a stitcher that can eliminate waste of resources and achieve cost reduction and improved productivity.

The first aspect of the present disclosure is a control method for a stitcher that includes a stitcher head configured to perform a reciprocating movement and a wire feed unit configured to feed a wire to the stitcher head and performs wire stitching on a paper bundle arranged at a wire stitching position in each cycle of the reciprocating movement of the stitcher head. The control method for the stitcher performed by a computer includes: determining in each cycle of the stitcher head whether or not thickness information on a paper bundle to be subjected to wire stitching in a next cycle is acquired; and when it is determined that the thickness information on the paper bundle to be subjected to wire stitching in the next cycle is not acquired, controlling the wire feed unit not to supply a wire in the current cycle.

The second aspect of the present disclosure is a program that causes a computer to perform the control method described above.

The third aspect of the present disclosure is a control device for a stitcher that includes a stitcher head configured to perform a reciprocating movement and a wire feed unit configured to feed a wire to the stitcher head and performs wire stitching on a paper bundle arranged at a wire stitching position in each cycle of the reciprocating movement of the stitcher head. The control device for the stitcher includes: a determination unit configured to determine in each cycle of the stitcher head whether or not thickness information on a paper bundle to be subjected to wire stitching in a next cycle is acquired, and a wire feed control unit configured to, when it is determined that the thickness information on the paper bundle to be subjected to wire stitching in the next cycle is not acquired, control the wire feed unit not to supply a wire in the current cycle.

The fourth aspect of the present disclosure is a stitcher including the control device described above.

The fifth aspect of the present disclosure is a sheet binding apparatus including the stitcher described above.

According to the present disclosure, an advantageous effect of making it possible to eliminate waste of resources and achieve cost reduction and improved productivity is achieved.

DETAILED DESCRIPTION

One embodiment of a sheet binding apparatus, a stitcher, a control device for a stitcher, and a control method for a stitcher according to the present disclosure will be described below with reference to the drawings. An example of the sheet binding apparatus may be a saddle binder used when book binding is performed.

Figure 1:
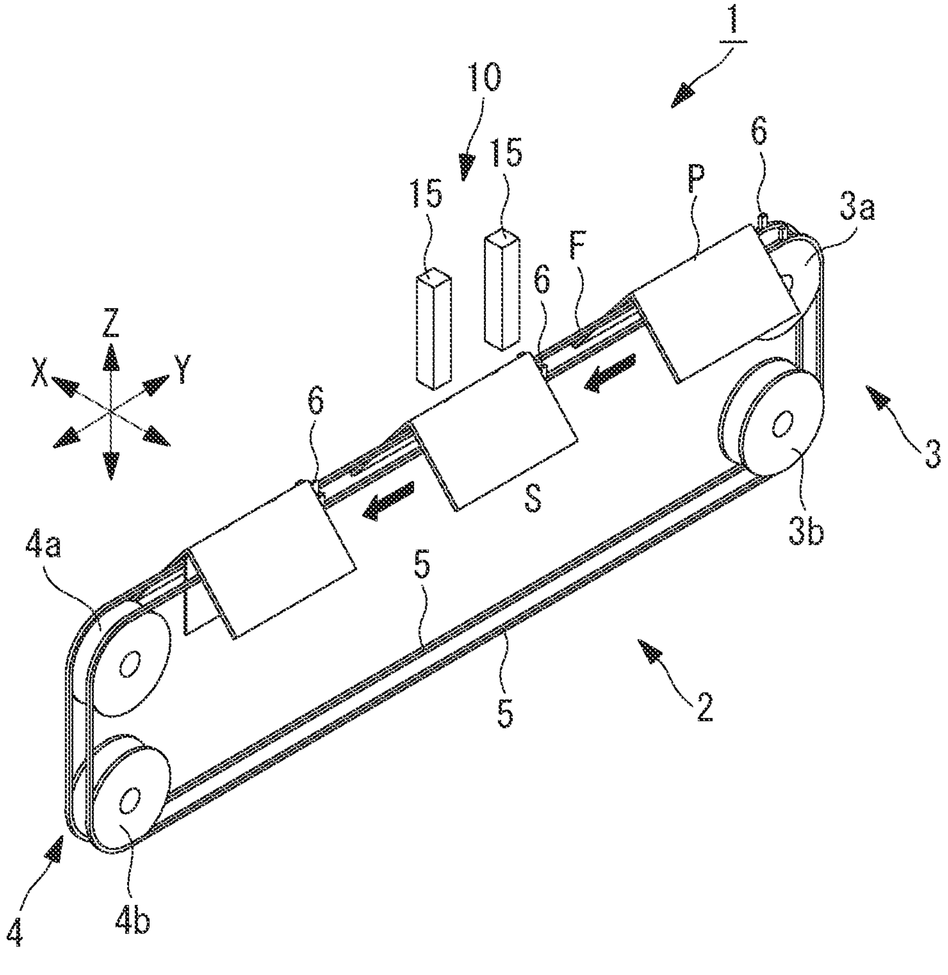
FIG. 1 is a schematic configuration diagram illustrating a configuration example of a sheet binding apparatus according to one embodiment of the present disclosure.

FIG. 1 is a schematic configuration diagram illustrating a configuration example of a sheet binding apparatus 1 according to one embodiment of the present disclosure. As illustrated in FIG. 1, the sheet binding apparatus 1 includes a transport unit 2, a stopper (not illustrated), and a stitcher 10, for example.

The transport unit 2 transports paper bundles P along the transport path F in one direction. The stopper positions a paper bundle P at a predetermined stitching position S provided on the transport path F. The stitcher 10 performs wire stitching at predetermined positions of the paper bundle P arranged at the stitching position S. Specifically, the stitcher 10 performs wire stitching on predetermined points of the paper bundle P supplied to the predetermined stitching position S in each cycle of a reciprocating movement of a stitcher head 15.

Although a case where the transport unit 2 transports the paper bundle P folded in half in a saddled state and the stitcher 10 performs wire stitching at a predetermined position on the folding line of the folded paper bundle P is illustrated as an example in the present embodiment, the embodiment is not limited to this example. That is, the paper bundle P may be arranged on a horizontal surface and transported, and the wire stitching position may be an end of sheets or other parts of sheets.

The transport unit 2 has a first pulley pair 3 and a second pulley pair 4 that are arranged spaced apart from each other in a transport direction of the transport path F (Y-axis direction) and supported rotatably about horizontal axes (X-axis direction) orthogonal to the transport direction, respectively. The first pulley pair 3 includes an upper pulley **3*a* and a lower pulley 3*b* arranged spaced apart from each other in the perpendicular direction (Z-axis direction), for example. The second pulley pair 4 includes an upper pulley 4*a* and a lower pulley 4*b* arranged spaced apart from each other in the perpendicular direction (Z-axis direction), for example. Endless belts 5 are stretched between the first pulley pair 3 and the second pulley pair 4. Feed blades 6 are provided to the endless belts 5** at a predetermined interval.

Motive power is transmitted from a motive power source such as a motor to a pulley (for example, the pulley **4*b*), which is any of the pulleys forming the first pulley pair 3 and the second pulley pair 4, this causes the pulley to rotate, thereby the endless belts 5 are moved, and paper bundles saddled at intervals on the endless belts 5 are moved in the transport direction. Specifically, each feed blade 6 comes into contact with the rear end of each paper bundle P every time the paper bundle P is supplied on the transport path F from a processing device for the previous process (for example, a folding machine or the like) upstream of the sheet binding apparatus 1**. The saddled paper bundle P is then transported toward the stitching position S on the transport path F, positioned by a stopper (not illustrated), and stopped at the stitching position S.

The configuration of the transport unit 2 is not limited to the example described above, and various known configurations can be employed.

Figure 2:
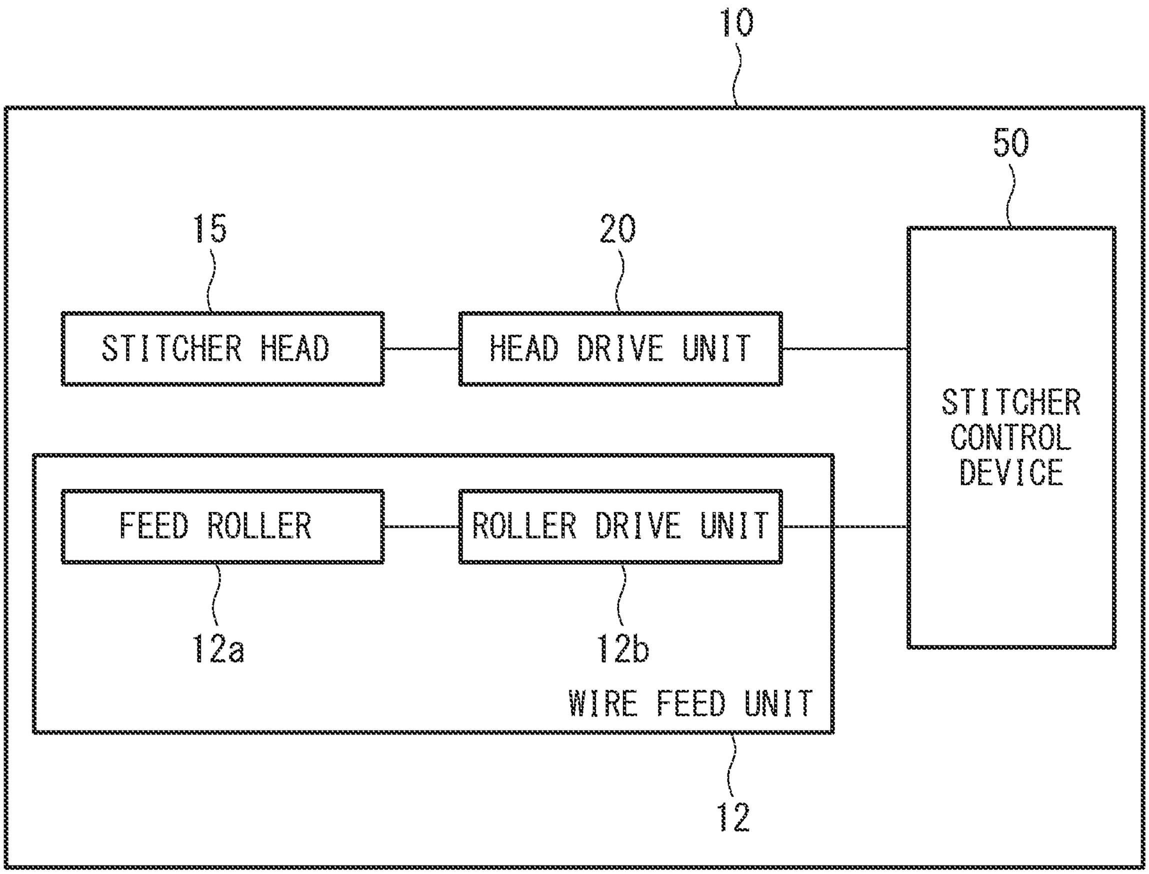
FIG. 2 is a block diagram illustrating a general configuration of a stitcher according to one embodiment of the present disclosure.

FIG. 2 is a block diagram illustrating the general configuration of the stitcher 10 according to the present embodiment. As illustrated in FIG. 2, the stitcher 10 includes a stitcher head(s) 15, a head drive unit 20, a wire feed unit 12, and a stitcher control device (a controller) 50.

The stitcher head 15 is reciprocated in the perpendicular direction (Z-axis direction) and performs wire stitching of a paper bundle arranged at the stitching position S in each cycle of the reciprocating movement, for example.

The head drive unit 20 is a drive unit to reciprocate the stitcher head 15.

The wire feed unit 12 supplies a wire to the stitcher head 15. The wire feed unit 12 includes a feed roller 12*a* and a roller drive unit 12*b*, for example.

The stitcher control device 50 controls the stitcher head 15 and the wire feed unit 12. The stitcher control device 50 controls the head drive unit 20 to control the reciprocating movement of the stitcher head 15, for example. The stitcher control device 50 controls the roller drive unit 12*b* to control the length of a wire supplied from the feed roller 12*a* to the stitcher head 15.

Figure 3:
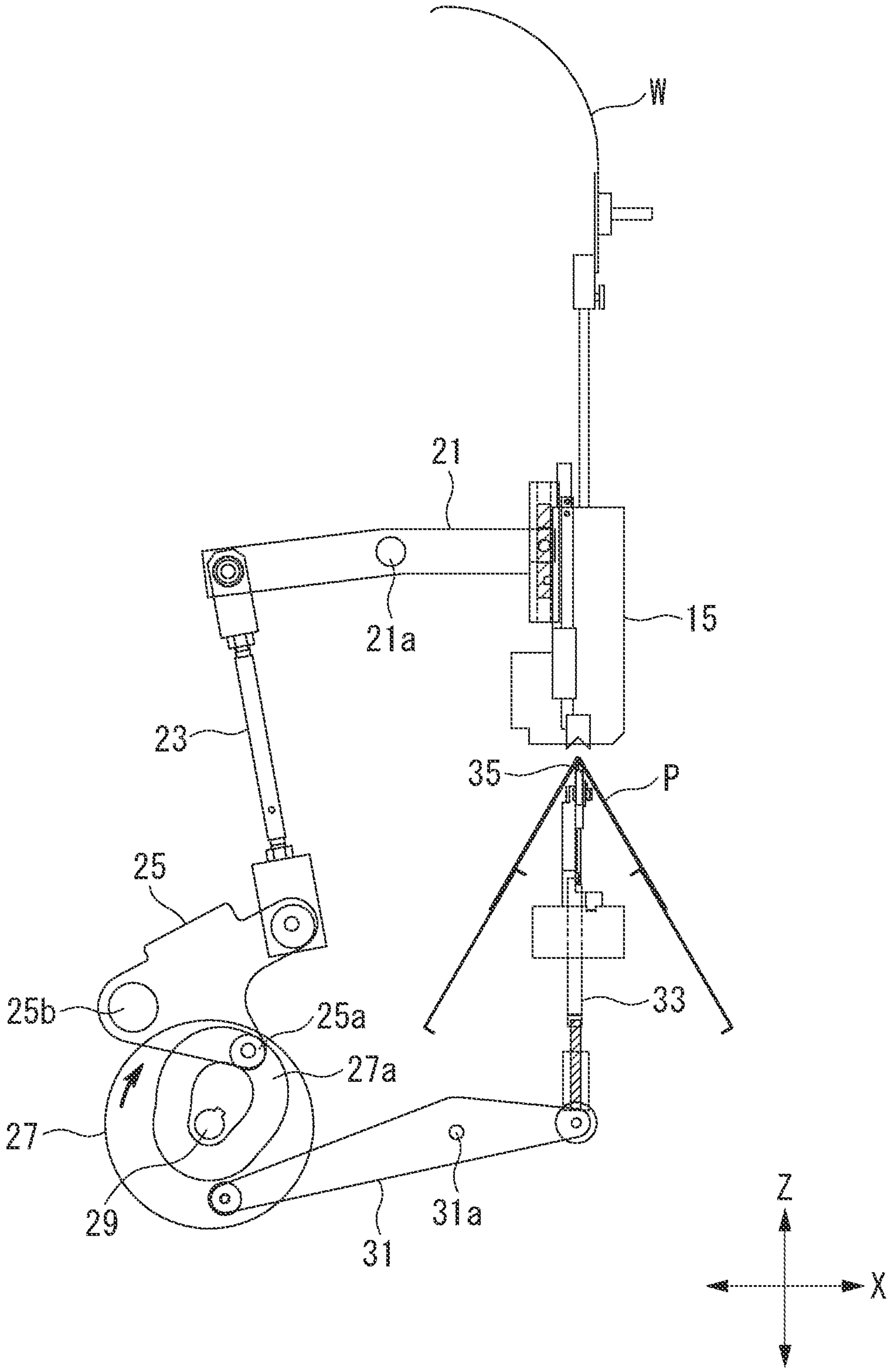
FIG. 3 is a schematic configuration diagram illustrating a configuration example of a head drive unit according to one embodiment of the present disclosure.

FIG. 3 is a schematic configuration diagram illustrating a configuration example of the head drive unit 20 according to the present embodiment. The X-axis and the Z-axis illustrated in FIG. 3 correspond to the X-axis and the Z-axis illustrated in FIG. 1, respectively. As illustrated in FIG. 1, in the present embodiment, the axis parallel to the transport direction of the paper bundle P is defined as the Y-axis, the axis orthogonal to the Y-axis in the horizontal plane is defined as the X-axis, and the axis orthogonal to both the X-axis and the Y-axis is defined as the Z-axis.

As illustrated in FIG. 3, the head drive unit 20 includes a first swing shaft 21 having one end (the right end in FIG. 3) pivotably connected to the stitcher head 15, a first coupling shaft 23 pivotably connected to the other end (the left end) of the first swing shaft 21, a swing plate 25 pivotably connected to the lower end of the first coupling shaft 23, and a rotary plate 27 provided under the swing plate 25.

The rotary plate 27 is rotated in one direction by a power shaft 29 that obtains motive power from a motor (not illustrated) and thereby rotates. A cam groove 27*a* is provided in the rotary plate 27. A cam roller 25*a* that travels inside the cam groove 27*a* is provided to the swing plate 25. The swing plate 25 swings about a fulcrum 25*b* in response to the motion of the cam roller 25*a*. Due to this swinging motion about the fulcrum 25*b*, the first coupling shaft 23 reciprocates in substantially the vertical direction. Due to this reciprocating motion of the first coupling shaft 23, the first swing shaft 21 swings about a fulcrum 21*a*. Due to this swinging motion of the first swing shaft 21, the stitcher head 15 connected to one end (the right end) of the first swing shaft 21 reciprocates in the vertical direction.

One end (the left end in FIG. 3) of the second swing shaft 31 is pivotably connected to the rotary plate 27. The second swing shaft 31 swings about a fulcrum 31*a* in response to the rotation of the rotary plate 27 and drives a clincher 33 in the vertical direction that is pivotably connected to the other end (the right end) of the second swing shaft 31. The clincher 33 is provided under the stitcher head 15 at a position such that the paper bundle P is interposed between the clincher 33 and the stitcher head 15. The clincher 33 has a claw 35 at the upper end. The claw 35 bends a projecting portion of a wire W driven into the paper bundle P.

The configuration of the head drive unit 20 described above is an example, and a known configuration of the head drive unit can be employed where appropriate. Although the case where the head drive unit 20 drives the clincher 33 has been described as an example for the above configuration, the configuration is not limited to this example. For example, a drive unit for driving the clincher 33 may be provided separately from the head drive unit 20.

Figure 4:
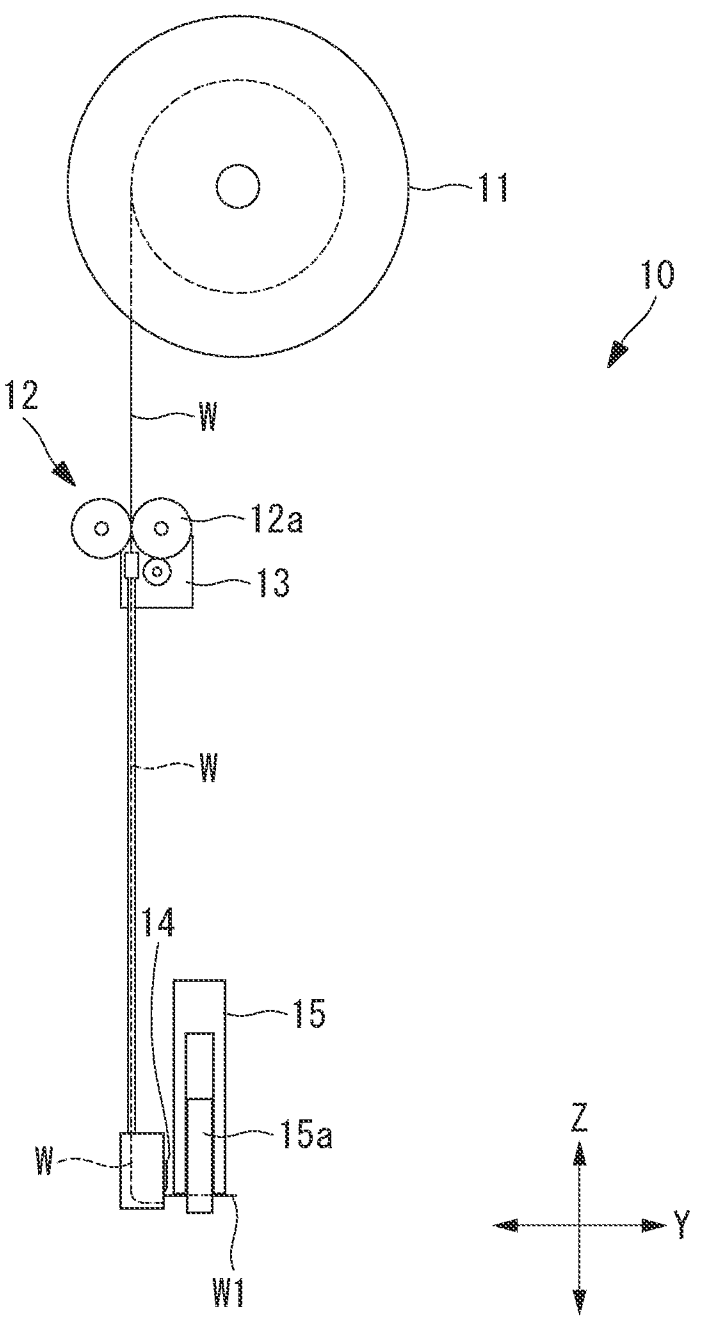
FIG. 4 is a schematic front view illustrating a configuration example of the stitcher when viewed from the X-axis direction.
Figure 5:
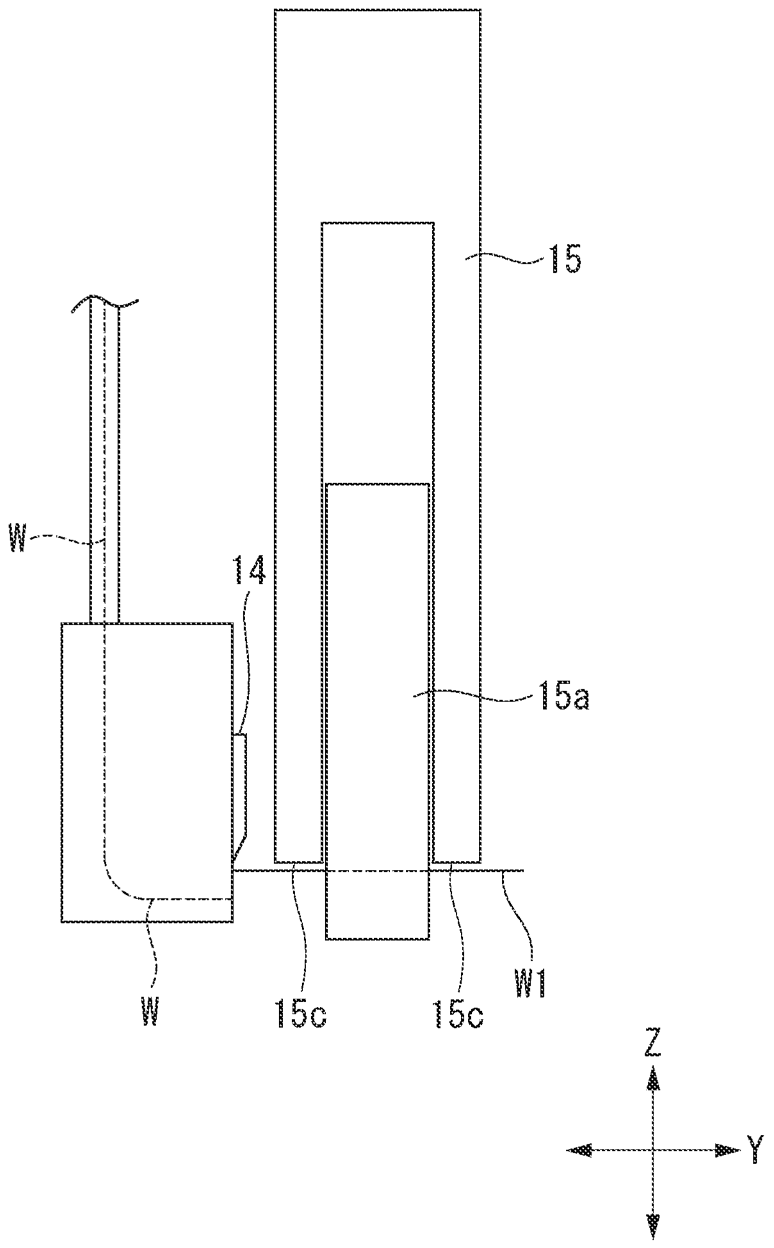
FIG. 5 is an enlarged view of a stitcher head illustrated in FIG. 4.
Figure 6:
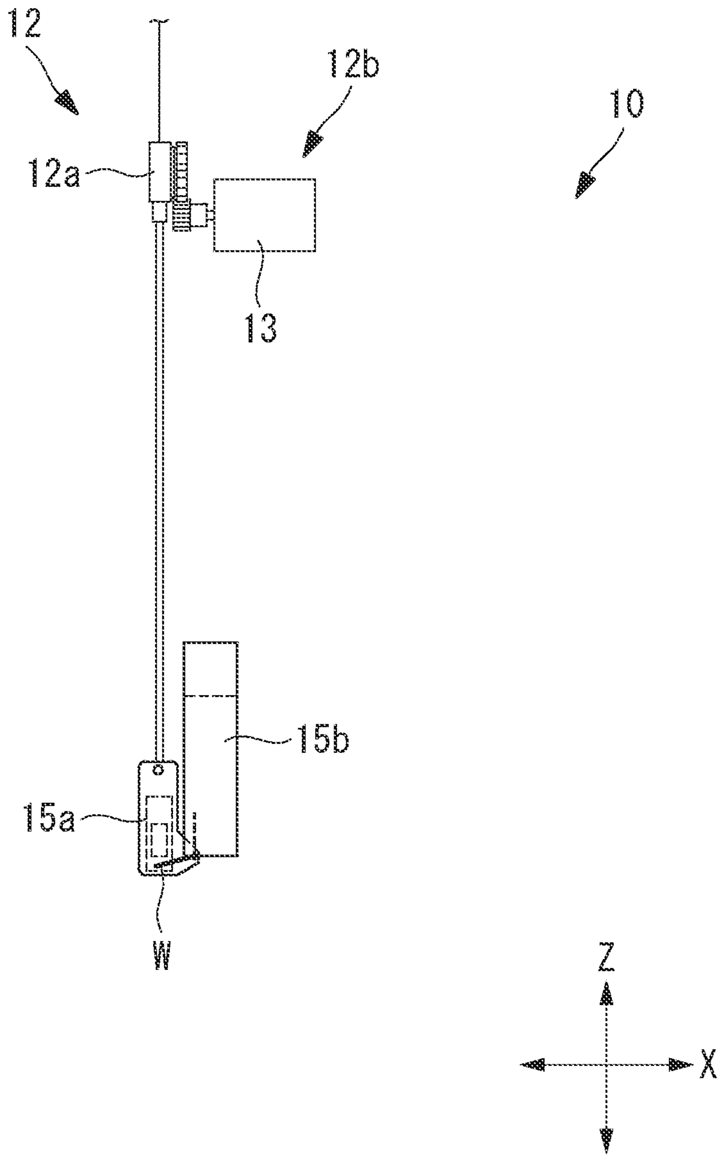
FIG. 6 is a schematic side view illustrating a configuration example of the stitcher when viewed from the Y-axis direction.
Figure 7:
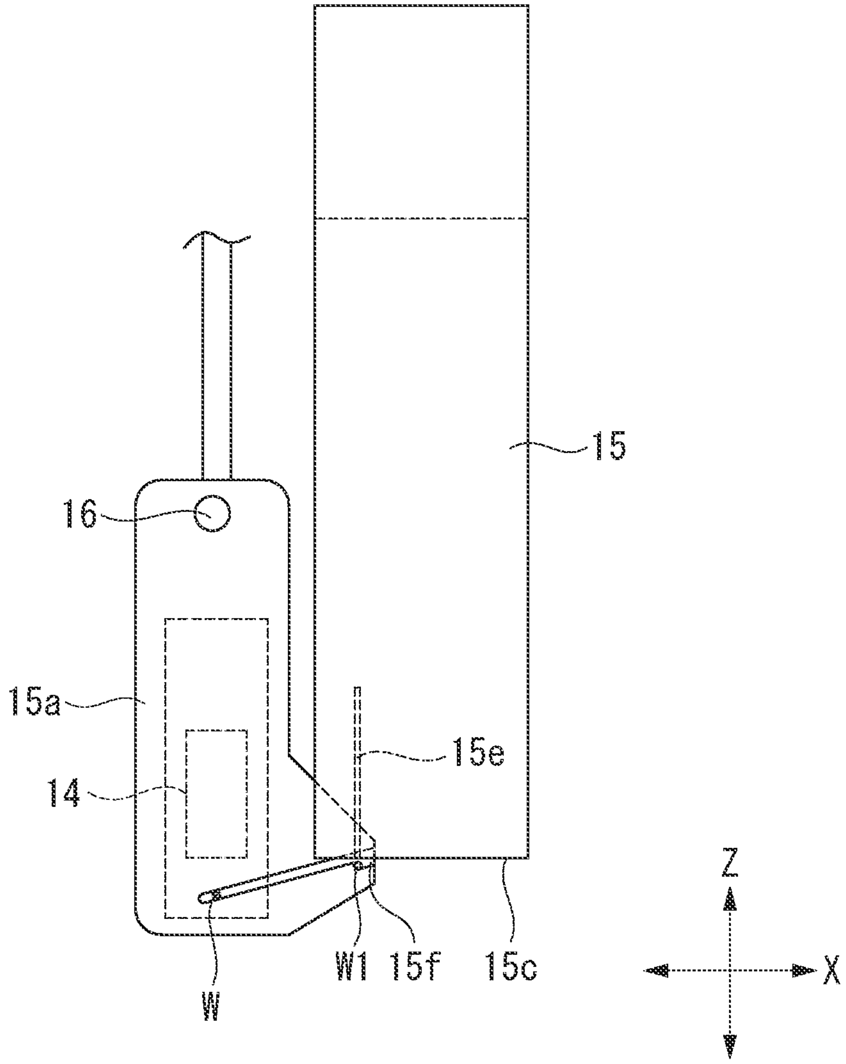
FIG. 7 is an enlarged view of the stitcher head illustrated in FIG. 6.

FIG. 4 is a schematic front view illustrating a configuration example of the stitcher 10 when viewed from the X-axis direction, and FIG. 5 is an enlarged view of the stitcher head 15 illustrated in FIG. 4. FIG. 6 is a schematic side view illustrating a configuration example of the stitcher 10 when viewed from the Y-axis direction, and FIG. 7 is an enlarged view of the stitcher head 15 illustrated in FIG. 6.

As illustrated in FIG. 4 to FIG. 7, the stitcher 10 includes a wire reel 11, the wire feed unit 12, a cutter 14, a wire holder 15*a*, and the stitcher head 15. The wire feed unit 12 supplies the wire W from the wire reel 11 to the stitcher head 15, specifically, the wire holder 15*a*. For example, the wire feed unit 12 includes the feed roller 12*a* and the roller drive unit 12*b*. For example, the feed roller 12*a* includes a roller pair provided so as to interpose the wire W therebetween. For example, a motor 13 of the roller drive unit 12*b* is coupled to the rotary shaft of any one roller of the roller pair directly or via a power transmission mechanism. The feed roller 12*a* is rotated by the motive power of the motor 13, and thereby the wire W is supplied to the wire holder 15*a*. An example of the motor 13 may be, for example, a stepping motor. In such away, the wire feed unit 12 has a self-propelled configuration that can feed out the wire W having any length without depending on the stroke length of the reciprocating movement of the stitcher head 15.

The configuration of the wire feed unit 12 is not limited to this example. The wire feed unit 12 can be of any structure as long as it has the self-propelled structure so as to feed a wire having a length in accordance with the thickness of a paper bundle to be subjected to wire stitching in the next cycle, and a known wire feed mechanism can be employed.

The wire holder 15*a* grips wires W, W1 fed from the wire feed unit 12. Herein, the wire W1 means a wire that is a wire driven into a paper bundle in the current cycle and cut in a length in accordance with the thickness of the paper bundle and, for the purpose of illustration, is distinguished from the wire W supplied from the wire feed unit 12. The wire holder 15*a* is configured to be swingable about a fulcrum 16. For example, the wire holder 15*a* obtains motive power from a motor (not illustrated) and swings about the fulcrum 16. The swinging motion of the wire holder 15*a* is controlled by the stitcher control device 50, for example.

A groove through which the wire W passes is formed in the wire holder 15*a*, and a gripping part 15*f* for gripping the wire W (W1) is provided in a front area of the groove, in other words, on the stitcher head 15 side.

The cutter 14 is provided slidably in the vertical direction (Z-axis direction) and cuts the wire W gripped by the wire holder 15*a*. The slide movement of the cutter 14 is controlled by the stitcher control device 50, for example.

The stitcher head 15 is formed in an inverse U-shape, for example, and as described later, includes bending parts 15*c* for bending the wire W1 held by the wire holder 15*a* into a U-shape, a groove 15*e* for holding the wire W1 that has been bent into the U-shape, a wire driver 15*b* (see FIG. 10) for driving the wire W1 into a paper bundle, and the like.

The stitcher 10 performs an operation to drive the wire W1 prepared in the previous cycle into a paper bundle (hereafter, referred to as "paper bundle P1") and an operation to prepare the wire W to be driven into a paper bundle to be subjected to wire stitching in the next cycle (hereafter, referred to as "paper bundle P2") in parallel during one cycle of the reciprocating movement of the stitcher head 15, which is the vertical movement thereof in the present embodiment.

Next, a series of operations in one basic cycle (one stroke) of the stitcher 10 will be described. The next operation is started every time the stitcher head 15 completes one stroke. In the present embodiment, one stroke in which the stitcher head 15 starts a reciprocating movement from a home position and then returns to the home position is defined as one cycle. The head drive unit 20, the roller drive unit 12*b*, the wire holder 15*a*, and the cutter 14 are controlled and driven by the stitcher control device 50, and thereby the operation of the stitcher below is implemented.

[Home Position]

Figure 8:
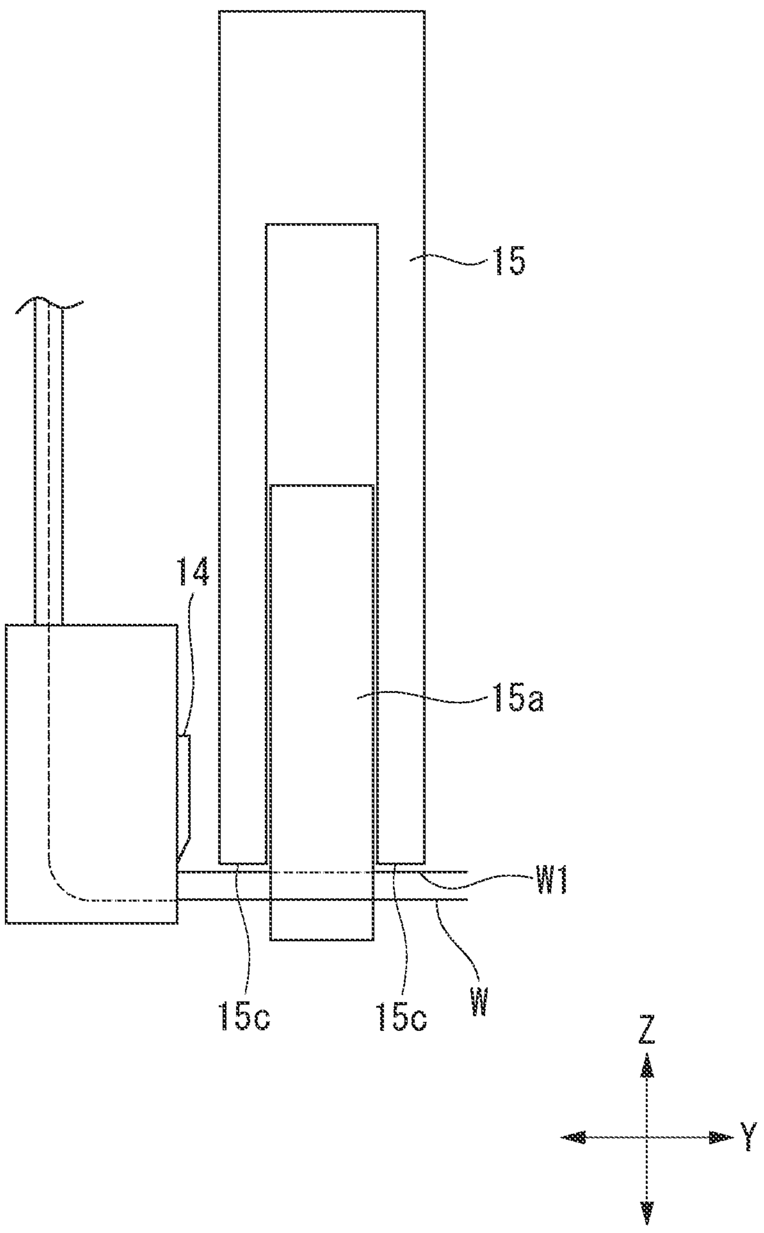
FIG. 8 is a schematic diagram of a state where the stitcher head according to one embodiment of the present disclosure is in a home position when viewed from the X-axis direction.
Figure 9:
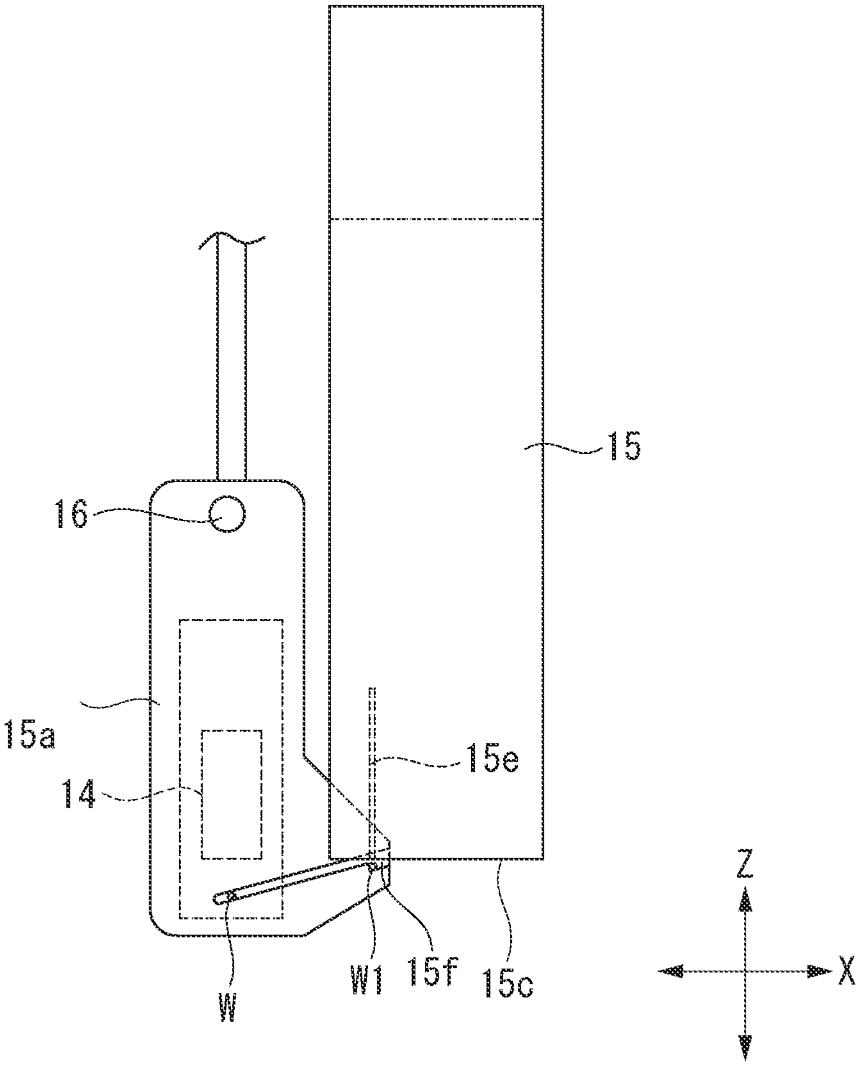
FIG. 9 is a schematic diagram of the stitcher head illustrated in FIG. 8 when viewed from the Y-axis direction.
Figure 10:
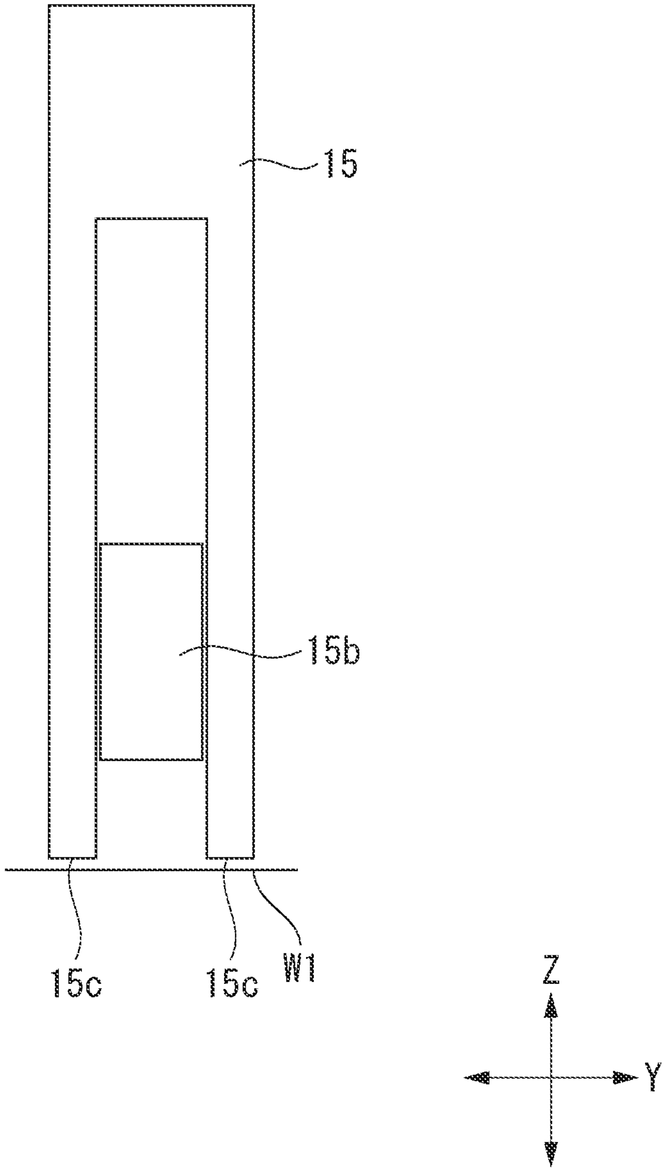
FIG. 10 is a schematic diagram illustrating a state of a wire driver in the stitcher head illustrated in FIG. 8.

In the present embodiment, the home position is set at the top dead center of the stitcher head 15. FIG. 8 is a schematic diagram of a state where the stitcher head 15 is in the home position when viewed from the X-axis direction, and FIG. 9 is a schematic diagram of a state where the stitcher head 15 is in the home position when viewed from the Y-axis direction. FIG. 10 is a schematic diagram illustrating a state of the wire driver 15*b* in the stitcher head 15 illustrated in FIG. 8, and FIG. 11 is a schematic diagram illustrating a state of the wire driver 15*b* in the stitcher head 15 illustrated in FIG. 9.

As illustrated in FIG. 8 and FIG. 9, the gripping part 15*f* of the wire holder 15*a* is arranged so as to overlap the groove 15*e* of the stitcher head 15 in the home position. In this home position, the gripping part 15*f* of the wire holder 15*a* grips the wire W1 cut into a length in accordance with the thickness of the paper bundle P1 subjected to wire stitching in the current cycle. In the following description, the paper bundle P1 means a paper bundle subjected to wire stitching in the current cycle, and the paper bundle P2 means a paper bundle to be subjected to wire stitching in the next cycle.

Furthermore, in the home position, the wire feed unit 12 is driven, and thereby the wire W is supplied to the wire holder 15*a*. At this time, the wire feed unit 12 is controlled by the stitcher control device 50 based on thickness information on the paper bundle P2. Accordingly, the wire W having a length in accordance with the thickness of the paper bundle P2 is fed.

Figure 11:
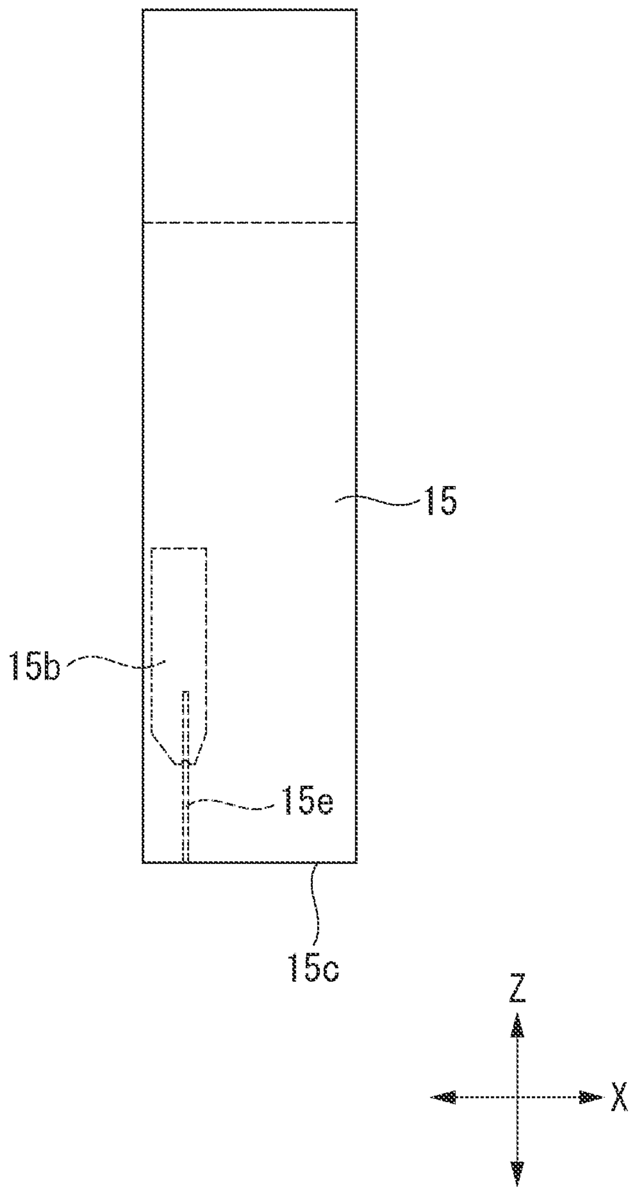
FIG. 11 is a schematic diagram illustrating a state of the wire driver in the stitcher head illustrated in FIG. 9.

As illustrated in FIG. 10 and FIG. 11, the wire driver 15*b* provided to the stitcher head 15 is arranged at a predetermined position (reference position) in the stitcher head 15.

[Lowered State]

Figure 12:
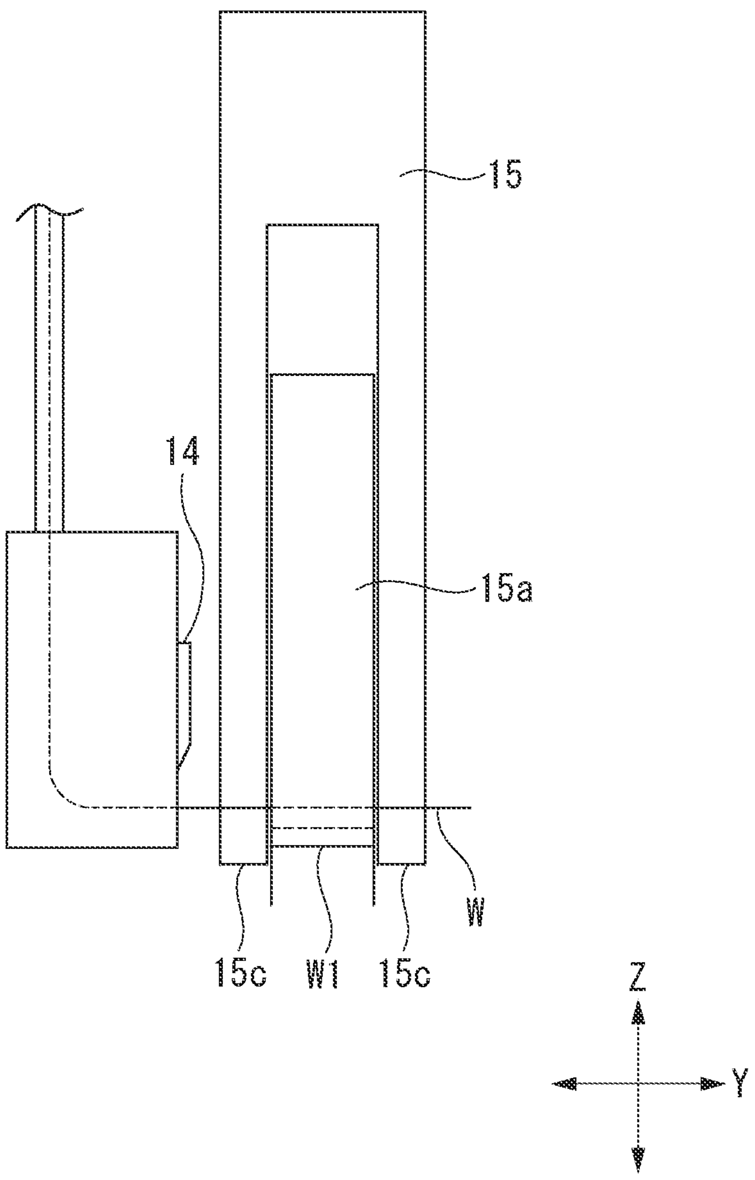
FIG. 12 is a schematic diagram illustrating one form when the stitcher head is lowered according to one embodiment of the present disclosure when viewed from the X-axis direction.
Figure 13:
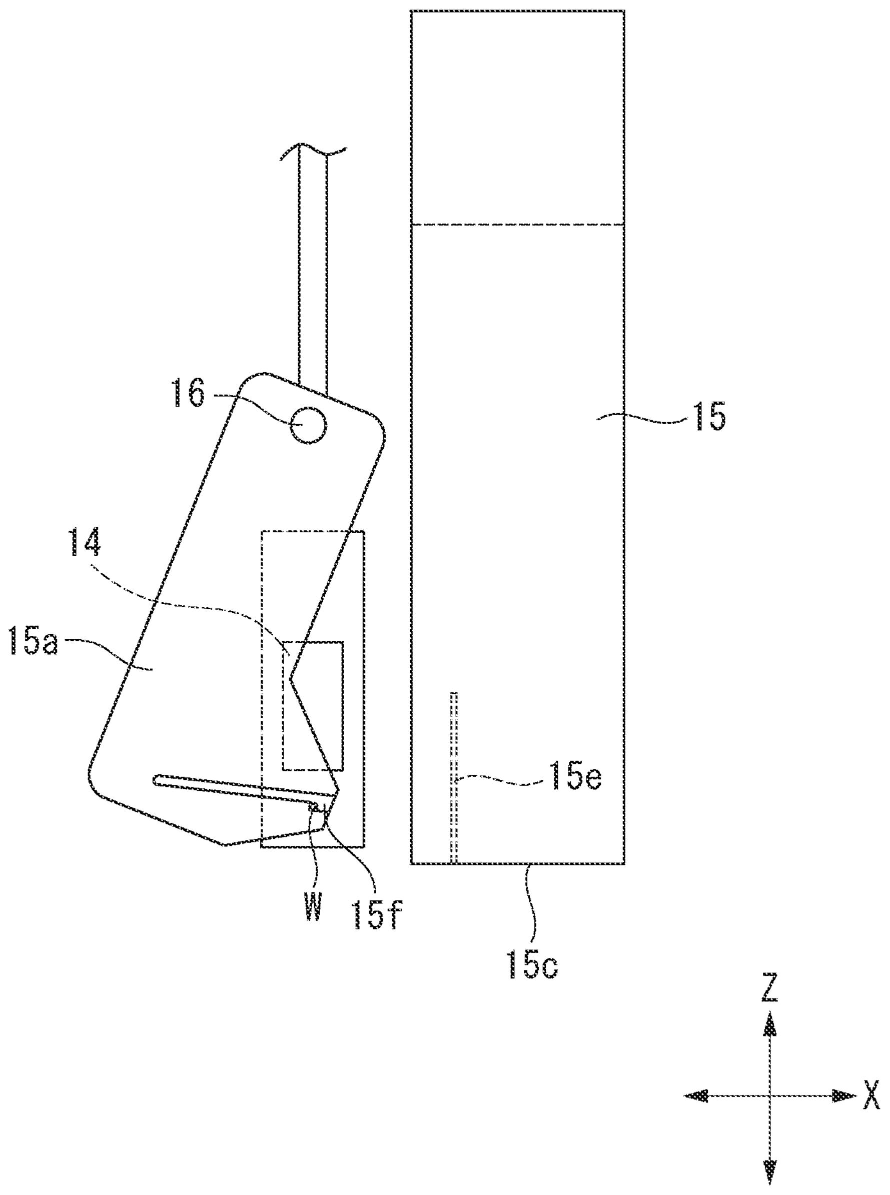
FIG. 13 is a schematic diagram of the stitcher head illustrated in FIG. 12 when viewed from the Y-axis direction.
Figure 14:
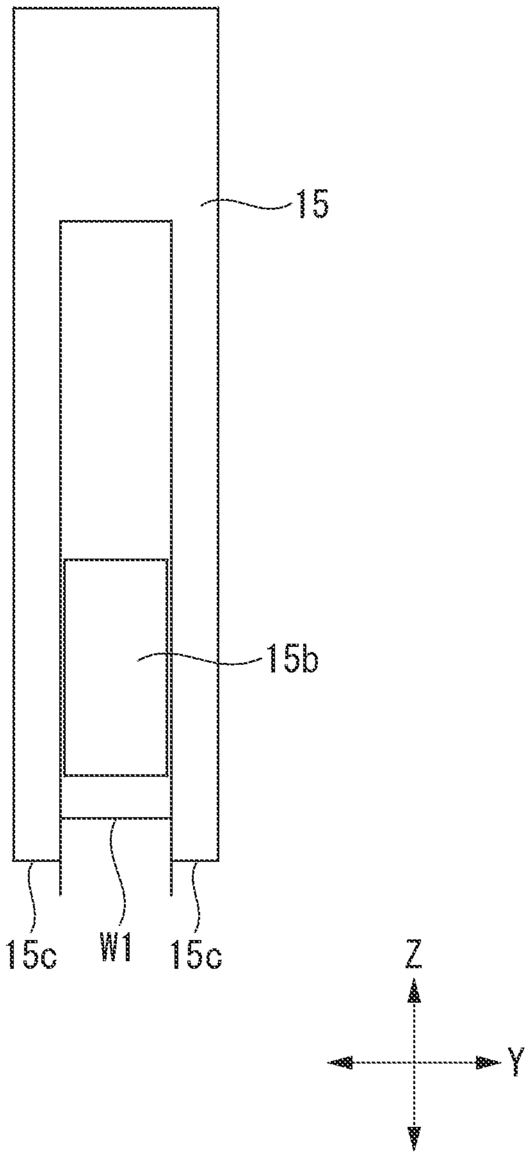
FIG. 14 is a schematic diagram illustrating a state of the wire driver in the stitcher head illustrated in FIG. 12.
Figure 15:
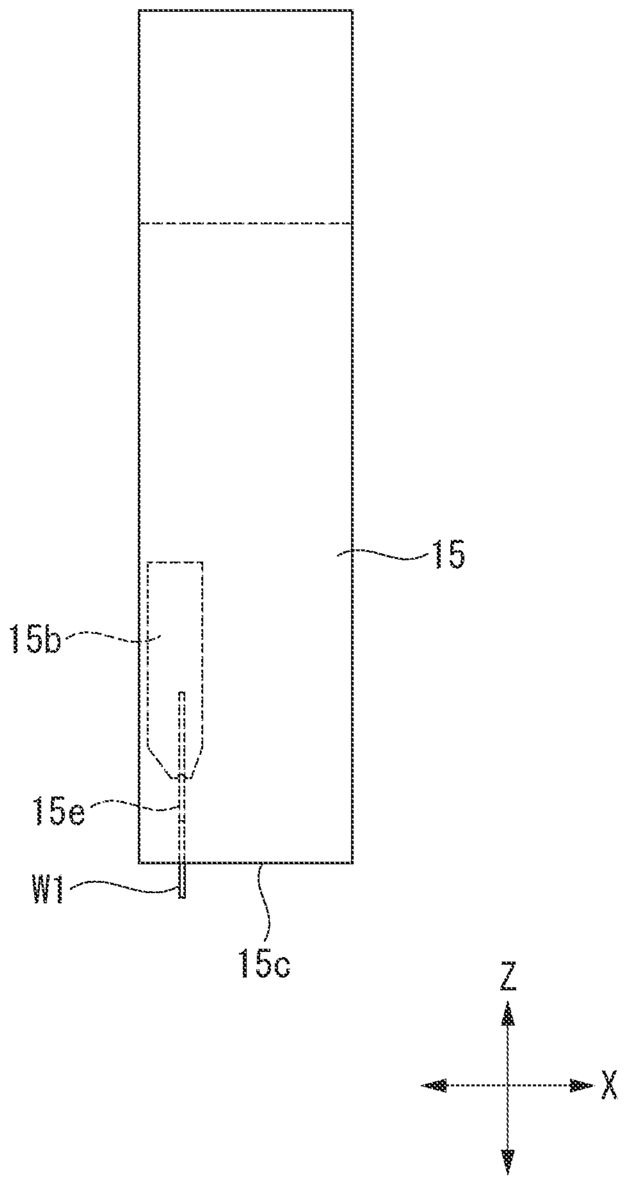
FIG. 15 is a schematic diagram illustrating a state of the wire driver in the stitcher head illustrated in FIG. 13.

FIG. 12 is a schematic diagram illustrating one form where the stitcher head 15 is lowered w % ben viewed from the X-axis direction, and FIG. 13 is a schematic diagram of the stitcher head 15 illustrated in FIG. 12 when viewed from the Y-axis direction. FIG. 14 is a schematic diagram illustrating a state of the wire driver 15*b* in the stitcher head 15 illustrated in FIG. 12, and FIG. 15 is a schematic diagram illustrating a state of the wire driver 15*b* in the stitcher head 15 illustrated in FIG. 13.

Once the stitcher head 15 starts being lowered from the top dead center, the wire W1 gripped by the wire holder 15*a* is bent into the U-shape by the bending parts 15*c* that are the bottom parts of the stitcher head 15. The stitcher head 15 is then further lowered, and thereby the U-shaped wire W1 gripped by the gripping part 15*f* of the wire holder 15*a* is passed to a wire gripping part (not illustrated) provided to the stitcher head 15. The stitcher head 15 continues to be lowered to the bottom dead center while gripping the wire W1. At this time, the wire driver 15*b* also continues to be lowered together with the stitcher head 15 (see FIG. 14 and FIG. 15).

On the other hand, after passing the wire W1, the wire holder 15*a* swings about the fulcrum 16 from the state of the home position and thereby moves back by a predetermined amount in a direction away from the stitcher head 15 resulting in a state illustrated in FIG. 13. When a state where the wire W from the wire feed unit 12 is gripped by the gripping part 15*f* of the wire holder 15*a* is established, the cutter 14 slides downward, and thereby the wire W is cut. Accordingly, the wire W1 to be driven into the paper bundle in the next cycle is prepared.

Herein, the timings that the wire feed unit 12 starts and stops feeding the wire W are not particularly limited. For example, the stitcher head 15 may start being lowered after the end of supply of the wire W by the wire feed unit 12. The feeding of the wire W by the wire feed unit 12 may be started after the stitcher head 15 starts being lowered.

[Bottom Dead Center]

Figure 16:
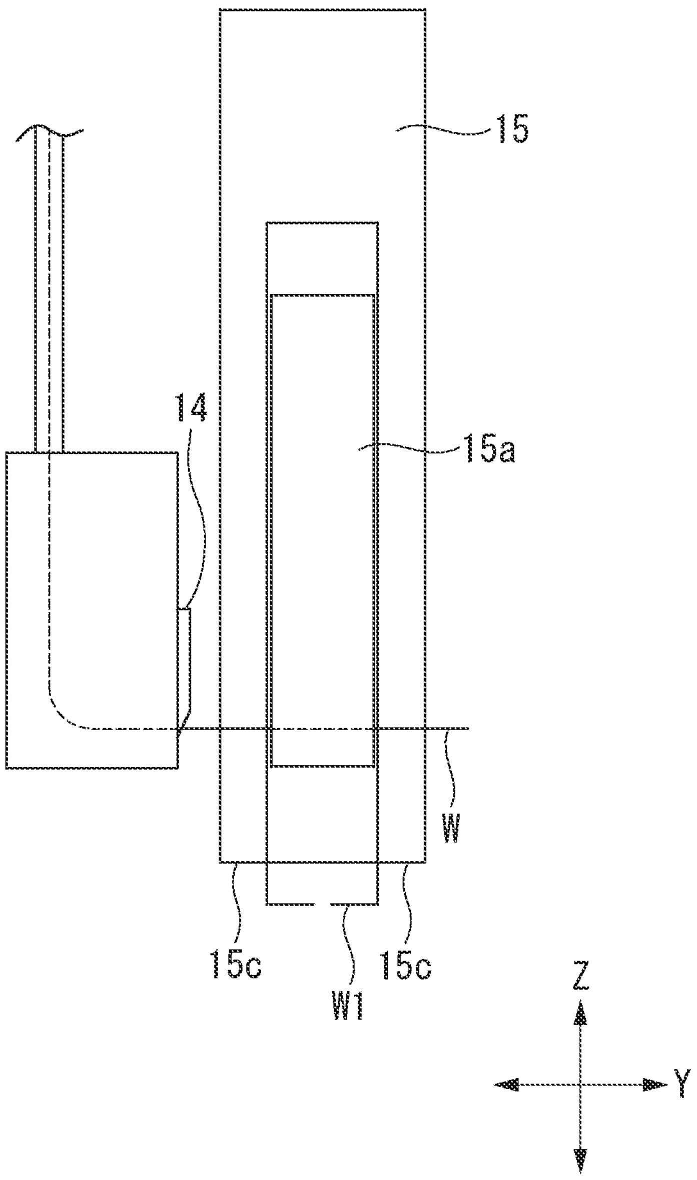
FIG. 16 is a schematic diagram of a state where the stitcher head according to one embodiment of the present disclosure is at the bottom dead center when viewed from the X-axis direction.
Figure 17:
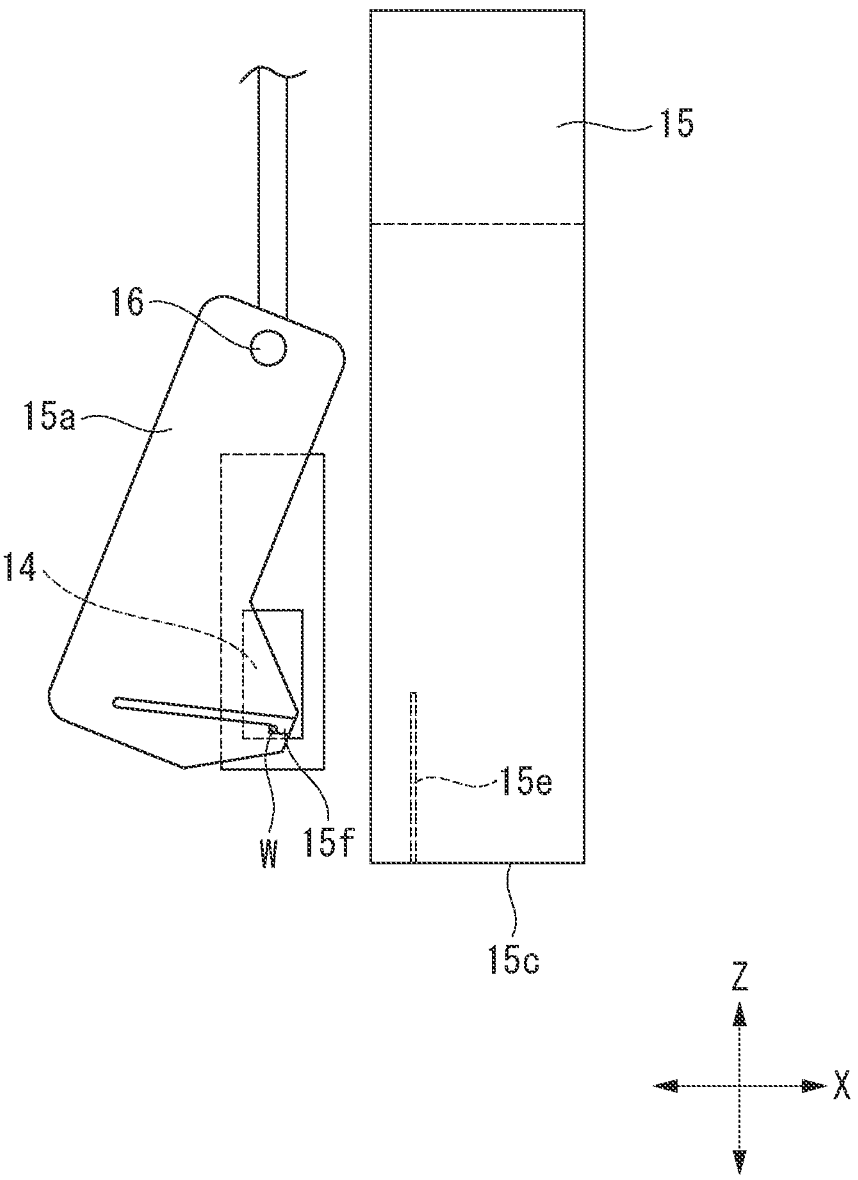
FIG. 17 is a schematic diagram of the stitcher head illustrated in FIG. 16 when viewed from the Y-axis direction.
Figure 18:
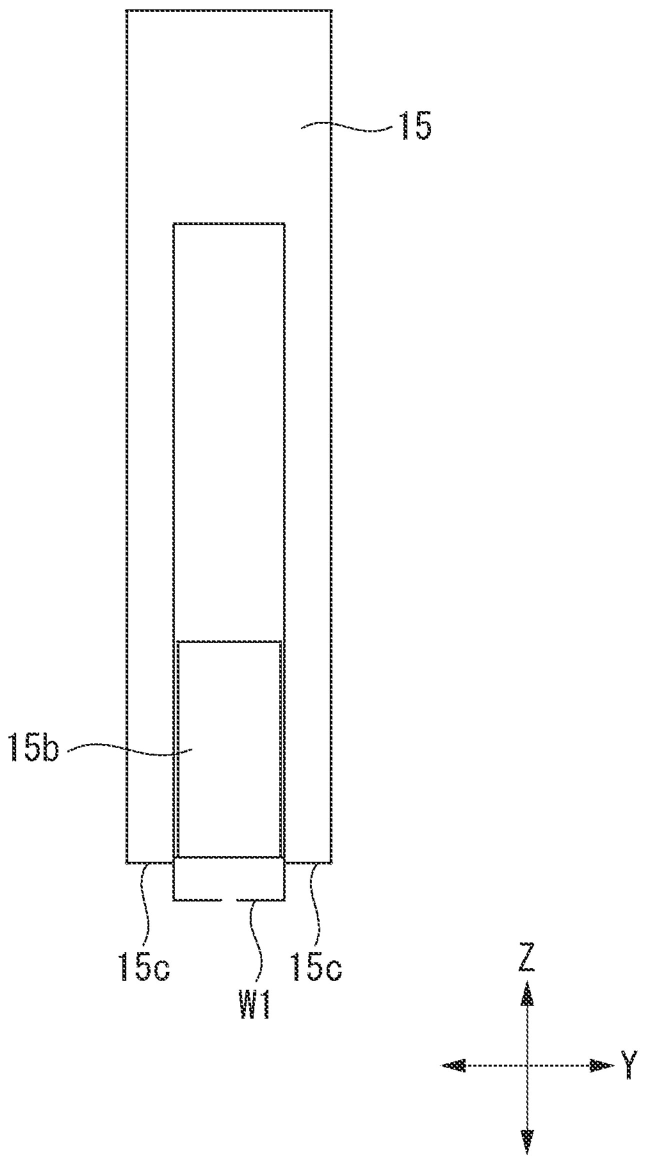
FIG. 18 is a schematic diagram illustrating a state of the wire driver in the stitcher head illustrated in FIG. 16.
Figure 19:
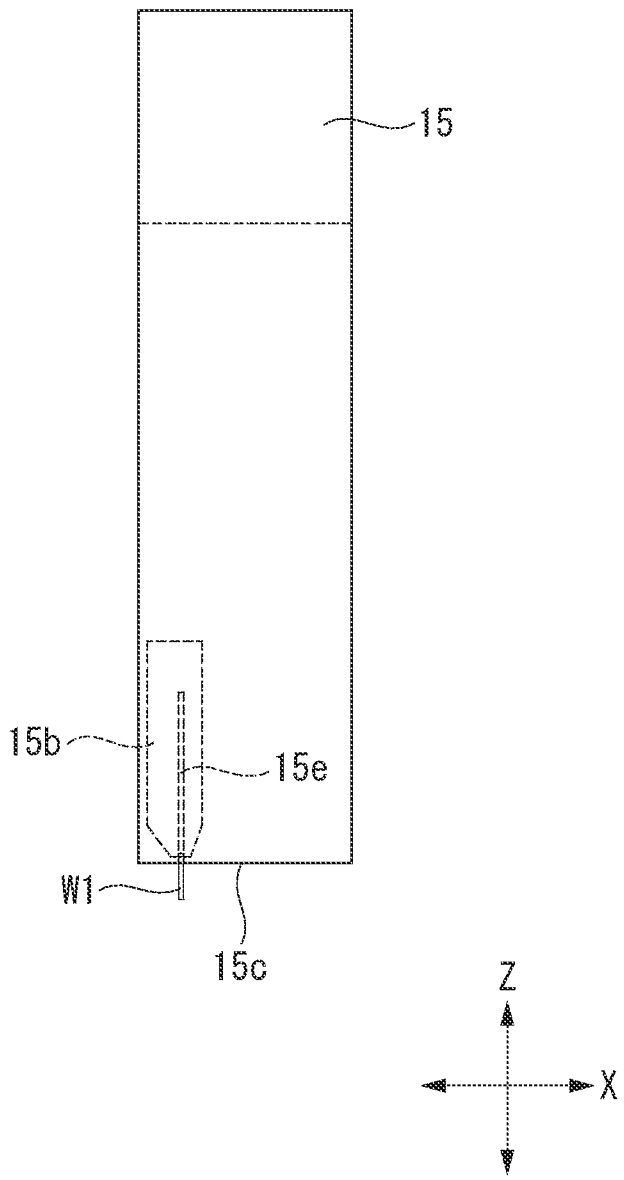
FIG. 19 is a schematic diagram illustrating a state of the wire driver in the stitcher head illustrated in FIG. 17.

FIG. 16 is a schematic diagram of a state of the stitcher head 15 is at the bottom dead center when viewed from the X-axis direction, and FIG. 17 is a schematic diagram of the stitcher head 15 illustrated in FIG. 16 when viewed from the Y-axis direction. FIG. 18 is a schematic diagram illustrating a state of the wire driver 15*b* in the stitcher head 15 illustrated in FIG. 16, and FIG. 19 is a schematic diagram illustrating a state of the wire driver 15*b* in the stitcher head 15 illustrated in FIG. 17.

Once the stitcher head 15 reaches the bottom dead center, the lower end of the stitcher head 15 (bending parts 15*c*) presses the top surface of the paper bundle P1, and the wire driver 15*b* is further lowered and fully drives the wire W1 into the paper bundle P1. At this time, the claw 35 of the clincher 33 bends the leg of the wire W projecting out of the paper bundle P1, and thereby the wire stitching is completed.

In response to the completion of the wire stitching, the stitcher head 15 is lifted toward the home position, and along with this lifting motion, the wire holder 15*a* swings about the fulcrum 16 toward the state of the home position.

The cycle described above is then repeated, and thereby wire stitching can be continuously performed.

The movement of the wire holder 15*a* and the one-cycle operation of the stitcher head described above are examples and not limited thereto. For example, the home position of the stitcher head 15 is not limited to the top dead center. For example, the home position may be provided at the intermediate point between the top dead center and the bottom dead center. Because it is sufficient as long as a wire for a paper bundle to be subjected to wire stitching in the next one cycle is prepared during the current one cycle of the stitcher head 15, the timings to start and stop feeding a wire and the timing to cut the wire can be designed as appropriate. The above timing to pass the wire W1 for wire stitching in the current cycle from the wire holder 15*a* to the stitcher head 15 is also an example, and any timing may be employed as long as the passing operation from the wire holder 15*a* to the stitcher head 15 is completed at any timing before a wire is driven into.

The configuration of the stitcher head and the configuration and structure of the wire holder 15*a* or the like are also examples, and the conventional structure can be employed where appropriate without being limited to these examples.

Figure 20:
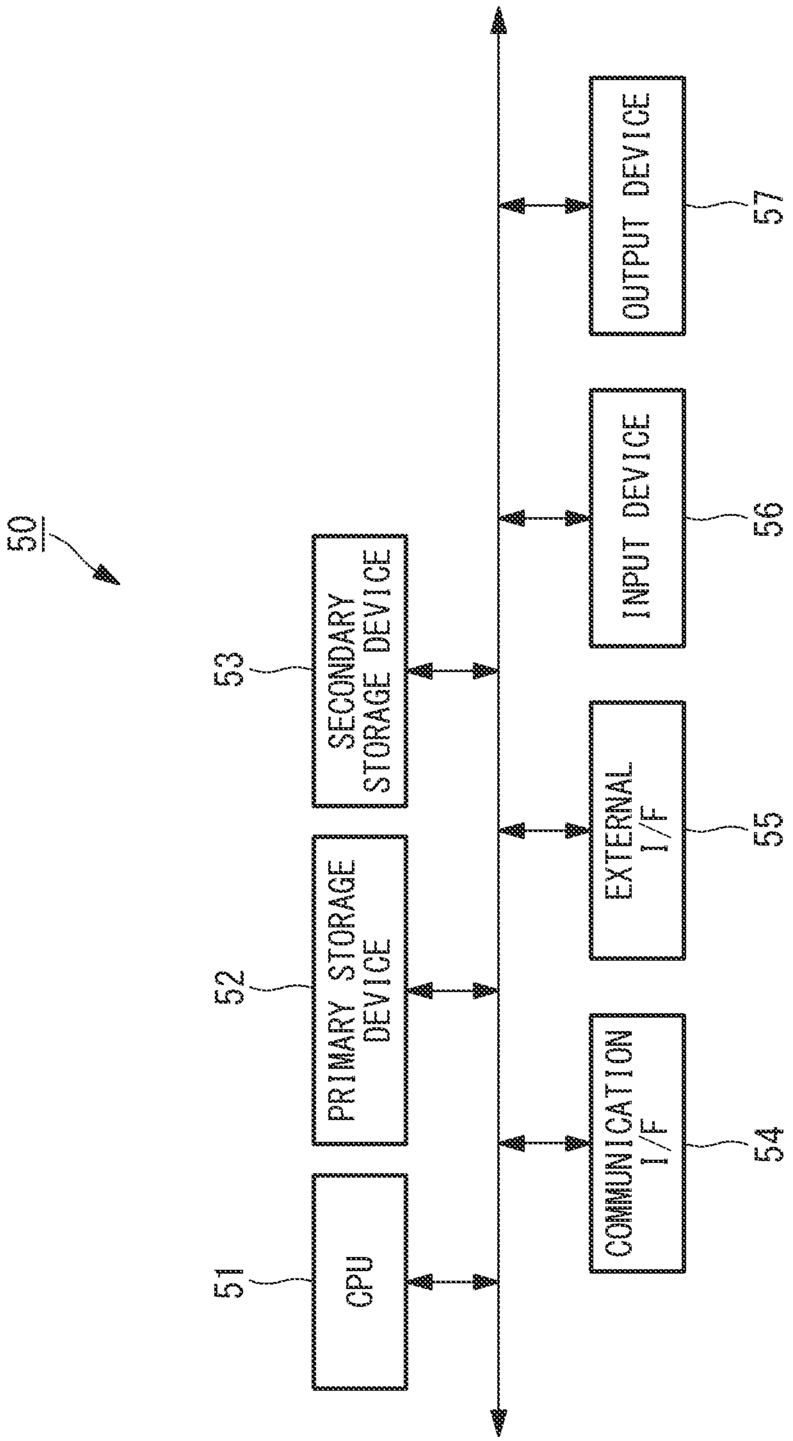
FIG. 20 is a diagram illustrating an example of a hardware configuration of a stitcher control device according to one embodiment of the present disclosure.

Next, the stitcher control device 50 according to the present embodiment will be described. FIG. 20 is a diagram illustrating an example of the hardware configuration of the stitcher control device 50 according to the present embodiment. The stitcher control device (controller) 50 includes a central processing unit (CPU: processor) 51, a primary storage device (main memory) 52, and a secondary storage device (secondary storage: memory) 53, for example. The stitcher control device 50 may include a communication interface 54, an external interface 55, an input device 56, an output device 57, and the like.

For example, the CPU 51 controls the stitcher 10 by using operating system (OS) stored in the secondary storage device 53 connected via a bus and performs various processes by executing various programs stored in the secondary storage device 53. One or a plurality of CPUs 51 may be provided to implement a process in cooperation with each other.

For example, the primary storage device 52 is formed of a writable memory such as a cache memory, a random access memory (RAM), or the like and utilized as a work area in which reading of an execution program for the CPU 51, writing of data processed by the execution program, or the like are performed.

The secondary storage device 53 is a non-transitory computer readable storage medium. For example, the secondary storage device 53 is a magnetic disk, a magneto-optical disk, a CD-ROM, a DVD-ROM, a semiconductor memory, or the like. An example of the secondary storage device 53 may be a read only memory (ROM), a hard disk drive (HDD), a solid state drive (SSD), a flash memory, or the like. For example, the secondary storage device 53 stores OS used for controlling the stitcher 10 such as Windows (registered trademark), iOS (registered trademark). Android (registered trademark), or the like, basic input/output system (BIOS), various device driver for hardware operation of peripheral devices, various application software, and various data or files or the like. The secondary storage device 53 stores programs used for implementing various processes or various data required for implementing various processes. A plurality of secondary storage devices 53 may be provided, and the program or data described above may be divided and stored in respective secondary storage device 53.

The communication interface 54 functions as an interface for connecting to a network to communicate with other devices and transmitting and receiving information. For example, the communication interface 54 communicates with other devices via a wired connection or a wireless connection. The wireless communication may be communication over a line such as Bluetooth (registered trademark), Wi-Fi, a mobile communication system (3G, 4G, 5G, 6G, LTE, or the like), a wireless local area network (LAN), or the like. An example of wired communication may be communication over a line such as a wired LAN.

The external interface 55 is an interface for connecting to an external device. An example of the external device may be an external monitor, a USB memory, an external HDD, an external camera, or the like. Although only one external interface is depicted in the example illustrated in FIG. 16, a plurality of external interface may be provided.

An example of the input device 56 may be a touch panel, a keyboard, or the like. By operating the input device 56, an operator is able to input an instruction, a numerical value, or the like used for causing the sheet binding apparatus 1 or the stitcher 10 to perform a predetermined operation, for example.

An example of the output device 57 may be a display, a printer, or the like. The touch panel has a function of the input device 56 and the function of the output device 57.

Herein, the stitcher control device 50 transfers information with a transport control device that controls the transport unit 2 to implement wire stitching to the paper bundle P. The stitcher control device 50 may further have a function of the transport control device that controls the transport unit 2 and may be implemented as a control device that controls the overall sheet binding apparatus 1.

Figure 21:
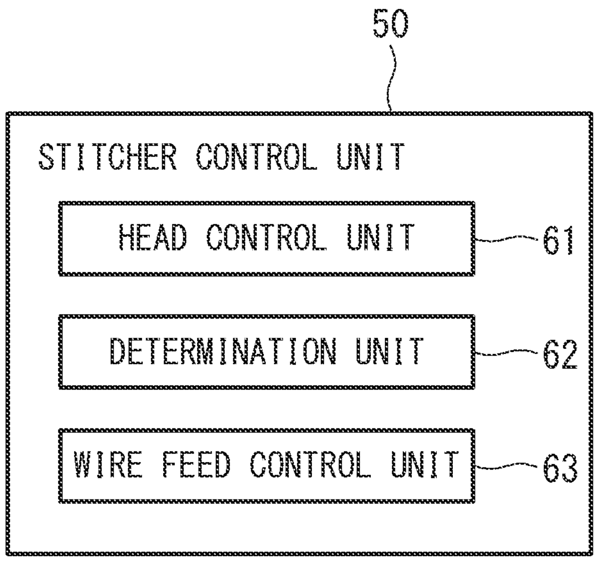
FIG. 21 is a function block diagram illustrating an example of functions of the stitcher control device according to one embodiment of the present disclosure.

FIG. 21 is a function block diagram illustrating an example of functions of the stitcher control device 50 according to the present embodiment.

A series of processes for implementing various functions of the stitcher control device 50 are stored in the secondary storage device 53 or the like in a form of a program as an example, and various functions are implemented when the CPU (processor) 51 loads the program into the primary storage device 52 and performs information processing and calculation processes. A form of being installed in advance in the secondary storage device 53, a form of being provided in a state of being stored in another non-transitory computer readable storage medium, a form of being delivered via a wired or wireless communication connection, or the like may be applied to the program. An example of the non-transitory computer readable storage medium may be a magnetic disk, a magneto-optical disk, a CD-ROM, a DVD-ROM, a semiconductor memory, or the like.

As illustrated in FIG. 21, for example, the stitcher control device 50 includes a head control unit 61, a determination unit 62, and a wire feed control unit 63. The head control unit 61 controls the stitcher head 15. Specifically, the head control unit 61 controls the head drive unit 20 and thereby performs control of the vertical movement of the stitcher head 15 or the like. The head control unit 61 may change the position of the bottom dead center of the stitcher head 15 in accordance with thickness information on a paper bundle subjected to wire stitching in the current cycle.

The determination unit 62 determines in each cycle of the stitcher head 15 whether or not the thickness information on the paper bundle to be subjected to wire stitching in the next cycle is acquired.

For example, the wire feed control unit 63 controls the roller drive unit **12*b* and thereby controls the rotation amount of the feed roller 12*a* to control supply of the wire W to the stitcher head 15**.

For example, if it is determined by the determination unit 62 that the thickness information on the paper bundle to be subjected to wire stitching in the next cycle is acquired, the wire feed control unit 63 controls the roller drive unit **12*b* based on the thickness information on the paper bundle and thereby controls the rotation amount of the feed roller 12*a* to supply the stitcher head 15** with the wire W having a length in accordance with the thickness of the paper bundle P subjected to wire stitching.

For example, if it is determined by the determination unit 62 that the thickness information on the paper bundle to be subjected to wire stitching in the next cycle is not acquired, the wire feed control unit 63 controls the wire feed unit 12 not to supply a wire in the current cycle. Specifically, the wire feed control unit 63 stops driving the roller drive unit **12*b*** in the current cycle.

Figure 22:
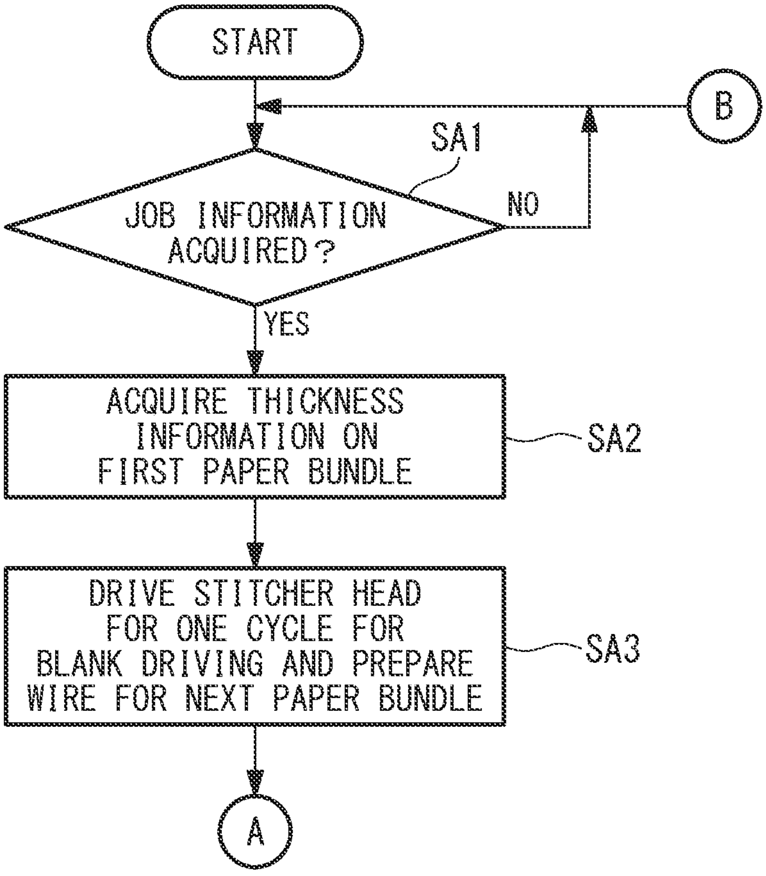
FIG. 22 is a flowchart illustrating an example of a processing procedure of a control method for the stitcher according to one embodiment of the present disclosure.
Figure 23:
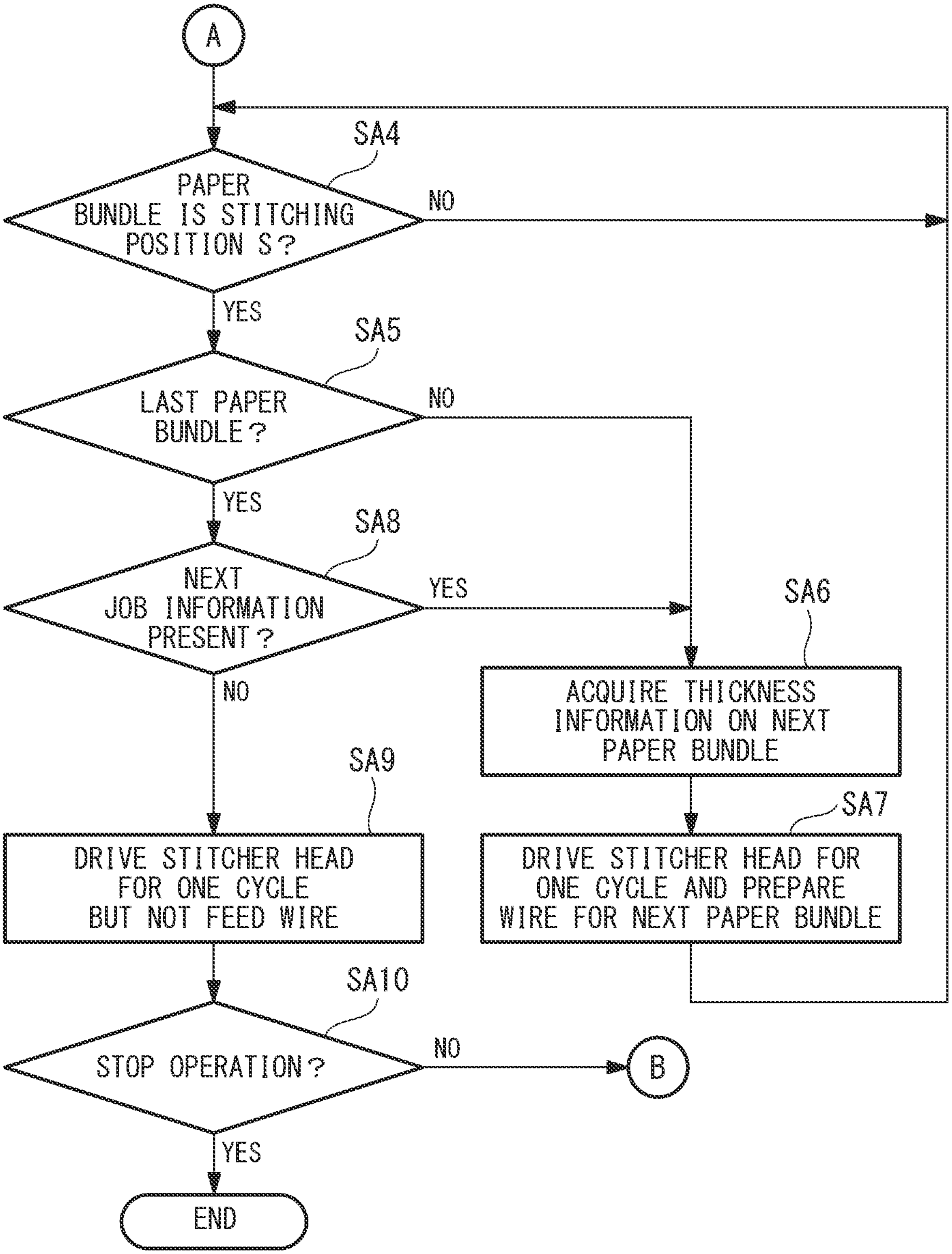
FIG. 23 is a flowchart illustrating an example of a processing procedure of the control method for the stitcher according to one embodiment of the present disclosure.

Next, a stitcher control method performed by the stitcher control device 50 according to the present embodiment will be described with reference to FIG. 22 to FIG. 23. FIG. 22 and FIG. 23 are flowcharts illustrating an example of a process procedure of a method for controlling the stitcher 10 according to the present embodiment. The stitcher control method according to the present embodiment is featured in wire feeding performed when starting an operation and stopping the operation. This will be described below with reference to the drawings. In the following description, a case of acquiring job information and thereby acquiring thickness information on a paper bundle will be described as an example. In the following example, all the paper bundles defined in single job information have the same thickness.

First, when the sheet binding apparatus 1 is not in operation, the stitcher head 15 is arranged at the home position described above.

Once the operation of the sheet binding apparatus 1 is started, the stitcher control device 50 determines whether or not job information, in other words, thickness information on a paper bundle that will now be subjected to wire stitching is acquired (SA1). For example, the job information is information including the number of paper bundles and thickness information on the paper bundle. For example, the job information may be received from a pre-processing machine via a communication line or may be input by the operator via the input device 56. An example of the pre-processing machine may be a gathering machine, a sheet accumulating machine, or the like. When the job information includes identification information that identifies the number of sheets in a paper bundle and the type of the sheets, the thickness of the paper bundle may be derived by calculation based on the number of sheets in the paper bundle and data on the thickness per sheet. When the job information includes data on the thickness per sheet, the number of sheets in a paper bundle may be counted by a sensor or the like, and the thickness of the paper bundle may be calculated from the count value and the data on the thickness per sheet.

If no job information is acquired (SA1: NO), the stitcher control device 50 is in the standby state until acquisition. In contrast, if job information is acquired (SA1: YES), the stitcher control device 50 acquires thickness information on a paper bundle included in the acquired job information (SA2), subsequently, drives the head drive unit 20 to reciprocate the stitcher head 15 by one stroke (one cycle) for blank driving, and prepares a wire for the next paper bundle (SA3).

Specifically, the stitcher control device 50 lowers the stitcher head 15 from the home position. In a period from a time the stitcher head 15 is in the home position to a time the stitcher head 15 reaches the bottom dead center, the stitcher control device 50 controls the wire feed unit 12 in accordance with the thickness of the paper bundle to be subjected to wire stitching in the next cycle, that is, in accordance with the thickness information on the paper bundle acquired in step SA2. Accordingly, as described above, the wire W having a length in accordance with the thickness of the paper bundle P to be subjected to wire stitching in the next cycle (that is, the first paper bundle of the current job) is fed to the wire holder 15*a*. The wire W is then cut by the cutter 14 while being gripped by the gripping part 15*f* of the wire holder 15*a*, and thereby the wire W1 for the next cycle is prepared.

On the other hand, when the stitcher head 15 reaches the bottom dead center, the wire driving operation by the wire driver 15*b* is completed. At this time, however, the stitcher head 15 is in a state of gripping no wire. Therefore, the wire driver 15*b* performs blank driving. After the blank driving is performed, the stitcher head 15 moves to the home position.

In such a way, when the blank driving is performed, transport by the transport unit 2 is started, and the first paper bundle P to be subjected to wire stitching is arranged at the stitching position S.

Subsequently, the stitcher control device 50 determines whether or not the paper bundle P is arranged at the stitching position S (SA4). If it is determined that no paper bundle is present at the stitching position S (SA4: NO), the standby state is maintained until a paper bundle is arranged at the stitching position S. In contrast, if it is determined that a paper bundle is arranged at the stitching position S (SA4: YES), it is subsequently determined whether or not the paper bundle P to be subjected to wire stitching in this cycle is the last paper bundle in the running job (SA5). For example, whether or not the paper bundle P is the last paper bundle can be determined by counting the number of paper bundles fed to the wire stitching position S by using a counter (not illustrated) connected to the stitcher control device 50 or may be determined by reading a code printed on the last paper bundle.

If it is determined as a result that the paper bundle P is not the last paper bundle (SA5: NO), the stitcher control device 50 acquires the thickness of the paper bundle P2 to be subjected to wire stitching next (SA6). For example, this process may be replaced with checking the thickness information on the paper bundle P2 included in the job information.

Subsequently, the stitcher control device 50 drives the head drive unit 20 to reciprocate the stitcher head 15 by one stroke (one cycle). Accordingly, a wire is driven into a paper bundle located at the stitching position S. The stitcher control device 50 controls the wire feed unit 12 to supply the stitcher head 15 with a wire having a length in accordance with the thickness of the next paper bundle and causes the wire holder 15*a* to grip the wire for the next paper bundle (SA7). In such a way, in response to completion of the wire stitching in the current cycle, the process returns to step SA4, and the subsequent process is performed.

The process of steps SA4 to SA7 is then repeated, thereby, in each cycle of the stitcher head 15, a wire is driven into the paper bundle, and a wire having a length in accordance with the thickness of the paper bundle to be subjected to wire stitching in next cycle is prepared. Then, if it is determined in step SA5 that the paper bundle set at the stitching position S is the last paper bundle of the running job (SA5: YES), it is determined whether or not next job information is acquired (SA8).

If the next job information is acquired as a result (SA8: YES), the process proceeds to step SA6 to acquire thickness information on a paper bundle to be subjected to wire stitching next from the next job information (SA6). The stitcher control device 50 then drives the head drive unit 20 to drive the stitcher head 15 for one cycle, thereby drive a wire into the last paper bundle of the current job located at the stitching position S, and prepare the wire W for the first paper bundle of the job to be executed next (SA7). The process returns to step SA4, and the subsequent process is performed. Accordingly, when information on the next job has been acquired at the end of one job, these two jobs can be continuously executed.

In contrast, if the next job information is not acquired in step SA8 (SA8: NO), while driving the head drive unit 20 to control the stitcher head 15 to reciprocate for one stroke (one cycle), the stitcher control device 50 does not drive the wire feed unit 12 and stops wire feeding (SA9). Accordingly, while the wire is driven into the paper bundle located at the stitching position S, no wire is prepared for the next paper bundle. That is, the stitcher head 15 returns to the home position without the wire holder 15*a* gripping a wire.

Subsequently, the stitcher control device 50 determines whether or not to terminate the operation (SA10), that is, determines whether or not input for terminating the operation is provided. If termination of the operation is input as a result (SA10: YES), the related process is terminated. In contrast, if termination of the operation is not input (SA10: NO), the process returns to step SA1, and the standby state is maintained until the next job information is acquired. Meanwhile, the operation is stopped when an instruction to stop the operation is acquired.

As described above, according to the sheet binding apparatus 1, the stitcher 10, the stitcher control device 50, and the stitcher control method of the present embodiment, it is determined in each cycle of the vertical movement of the stitcher head 15 whether or not thickness information on a paper bundle to be subjected to wire stitching in the next cycle is acquired, and if it is determined that the thickness information on a paper bundle to be subjected to wire stitching in the next cycle is not acquired, the wire feed unit 12 is controlled not to supply a wire in the current cycle. In contrast, if it is determined that the thickness information on a paper bundle to be subjected to wire stitching in the next cycle is acquired, the stitcher control device 50 controls the wire feed unit 12 in the current cycle to supply a wire having a length based on the thickness information on the paper bundle to be subjected to wire stitching in the next cycle.

Accordingly, when the thickness information on a paper bundle to be subjected to wire stitching in the next cycle is not acquired, the stitcher head 15 is stopped without the wire holder 15*a* gripping a wire. Thus, when job information on a job to be next executed is acquired, thickness information on a paper bundle to be subjected to wire stitching next from the job information is acquired, blank driving is then performed by the stitcher head 15, and furthermore, in the blank driving, a wire having a length in accordance with the thickness of the paper bundle to be subjected to wire stitching next is prepared.

When the thickness information on a paper bundle to be subjected to wire stitching in the next cycle is acquired, a wire having a length based on the thickness information on the paper bundle to be subjected to wire stitching in the next cycle is supplied and prepared in the current cycle. Accordingly, also in the next cycle, the wire having the length in accordance with the thickness of the paper bundle subjected to wire stitching in that cycle can be driven into the paper bundle.

As described above, wire feed is stopped in a cycle in which the stitcher head 15 is stopped, and blank driving is performed when driving of the stitcher head 15 is started. It is therefore possible to eliminate waste of resources and achieve cost reduction and improved productivity.

Although the present disclosure has been described above with the embodiments, the technical scope of the present disclosure is not limited to the scope described in the above embodiments. Various modifications and improvements can be added to the above embodiments within the scope not departing from the spirit of the disclosure, and any forms with addition of such modifications or improvements are also included in the technical scope of the present disclosure. Further, the above embodiments may be combined where appropriate.

The flow of the stitcher control method described in the above embodiments is also an example. Thus, an unnecessary step may be deleted, a new step may be added, or the order of processes may be exchanged within the scope not departing from the spirit of the present disclosure.

Although the case where thickness information on a paper bundle is acquired from job information has been described in the above embodiments, the disclosure is not limited to this example. For example, a barcode attached to each paper bundle may be read to acquire thickness information on a paper bundle for each paper bundle, and it may be determined for each vertical movement cycle of the stitcher head 15 whether or not thickness information on a paper bundle is acquired.

With respect to the method of acquiring thickness information on a paper bundle, other known schemes may be employed for the acquisition. For example, in a transport flow of the paper bundle P in the transport unit 2, a sensor that detects a thickness may be provided upstream of the predetermined stitching position S, and thickness information on a paper bundle may be acquired by the sensor.

LIST OF REFERENCES

1 sheet binding apparatus
2 transport unit
6 feed blade
10 stitcher
11 wire reel
12 wire feed unit
12*a* feed roller
12*b* roller drive unit
13 motor
14 cutter
15 stitcher head
15*a* wire holder
15*b* wire driver
15*c* bending part
15*e* groove
15*f* gripping part
16 fulcrum
20 head drive unit
33 clincher
35 claw
50 stitcher control device
51 CPU
52 primary storage device
53 secondary storage device
54 communication interface
55 external interface
56 input device
57 output device
61 head control unit
62 determination unit
63 wire feed control unit

What is claimed is:

1. A control device for a stitcher, wherein the stitcher comprises a stitcher head configured to perform a reciprocating movement in cycles and a wire feed unit configured to feed a wire to the stitcher head and performs wire stitching on a paper bundle arranged at a wire stitching position in each cycle of the reciprocating movement of the stitcher head, the control device comprising:

a determination unit configured to determine in each cycle of the stitcher head whether or not thickness information on a paper bundle to be subjected to wire stitching in a next cycle is acquired; and a wire feed control unit configured to, when it is determined that the thickness information on the paper bundle to be subjected to wire stitching in the next cycle is not acquired, control the wire feed unit not to supply a wire in a current cycle.

2. The control device for the stitcher according to claim 1, wherein, during a running job including a number of paper bundles, when next job information is not acquired before execution of a cycle in which wire stitching is performed on a last paper bundle for the running job, the determination unit determines that the thickness information on the paper bundle to be subjected to wire stitching in the next cycle is not acquired.

3. The control device for the stitcher according to claim 1 further comprising a head control unit configured to cause the stitcher head to perform blank driving when an operation of the stitcher is started.

4. The control device for the stitcher according to claim 3, wherein before causing the stitcher head to perform blank driving, the determination unit determines whether or not thickness information on a paper bundle to be subjected to wire stitching first after a start of the operation is acquired, wherein when it is determined that the thickness information on the paper bundle is acquired, the head control unit performs the blank driving, and wherein when it is determined that the thickness information on the paper bundle is acquired, the wire feed control unit controls the wire feed unit to supply a wire having a length corresponding to the acquired thickness of the paper bundle in a cycle in which the blank driving is performed.

5. A stitcher comprising the control device according to claim 1.

6. A sheet binding apparatus comprising the stitcher according to claim 5.

7. A control method for a stitcher, wherein the stitcher comprises a stitcher head configured to perform a reciprocating movement in cycles and a wire feed unit configured to feed a wire to the stitcher head and performs wire stitching on a paper bundle arranged at a wire stitching position in each cycle of the reciprocating movement of the stitcher head, the control method comprising:

determining in each cycle of the stitcher head whether or not thickness information on a paper bundle to be subjected to wire stitching in a next cycle is acquired; and controlling the wire feed unit not to supply a wire in a current cycle, when it is determined that the thickness information on the paper bundle to be subjected to wire stitching in the next cycle is not acquired.

8. The control method for the stitcher according to claim 7, further comprising, during a running job including a number of paper bundles, determining that the thickness information on the paper bundle to be subjected to wire stitching in the next cycle is not acquired, when next job information is not acquired before execution of a cycle in which wire stitching is performed on a last paper bundle for the running job.

9. The control method for the stitcher according to claim 7, further comprising causing the stitcher head to perform blank driving when an operation of the stitcher is started.

10. The control method for the stitcher according to claim 9, further comprising:

acquiring thickness information on a paper bundle to be subjected to wire stitching first after a start of the operation before causing the stitcher head to perform blank driving, and controlling, in a cycle in which the blank driving is performed, the wire feed unit to supply a wire having a length corresponding to the acquired thickness of the paper bundle.

11. The control method for the stitcher according to claim 9, further comprising controlling, in a cycle in which the blank driving is performed, the wire feed unit to supply a wire for a paper bundle to be subjected to wire stitching in a next cycle.

12. A non-transitory computer readable storage medium storing a control program for a stitcher, wherein the stitcher comprises a stitcher head configured to perform a reciprocating movement in cycles and a wire feed unit configured to feed a wire to the stitcher head and performs wire stitching on a paper bundle arranged at a wire stitching position in each cycle of the reciprocating movement of the stitcher head, the control program comprising:

determining in each cycle of the stitcher head whether or not thickness information on a paper bundle to be subjected to wire stitching in a next cycle is acquired; and when it is determined that the thickness information on the paper bundle to be subjected to wire stitching in the next cycle is not acquired, controlling the wire feed unit not to supply a wire in a current cycle.

* * * * *